US011454562B2

(12) United States Patent
Maccioni et al.

(10) Patent No.: US 11,454,562 B2
(45) Date of Patent: Sep. 27, 2022

(54) SENSOR ARRANGEMENT AND METHOD OF OPERATING A SENSOR ARRANGEMENT

(71) Applicant: Sciosense B.V., Eindhoven (NL)

(72) Inventors: Alberto Maccioni, La Spezia (IT); Willem Frederik Adrianus Besling, Eindhoven (NL); Olaf Wunnicke, Eindhoven (NL); Casper Van Der Avoort, Waalre (NL); Remco Henricus Wilhelmus Pijnenburg, Hoogeloon (NL); Anderson Pires Singulani, Graz (AT)

(73) Assignee: SCIOSENSE B.V., Eindhoven (NL)

( * ) Notice: Subject to any disclaimer, the term of this patent is extended or adjusted under 35 U.S.C. 154(b) by 51 days.

(21) Appl. No.: 17/053,135

(22) PCT Filed: Apr. 10, 2019

(86) PCT No.: PCT/EP2019/059152
§ 371 (c)(1),
(2) Date: Nov. 5, 2020

(87) PCT Pub. No.: WO2019/228701
PCT Pub. Date: Dec. 5, 2019

(65) Prior Publication Data
US 2021/0199528 A1   Jul. 1, 2021

(30) Foreign Application Priority Data

May 28, 2018 (EP) .................... 18174624

(51) Int. Cl.
*G01L 27/00* (2006.01)
*G01L 9/12* (2006.01)
(Continued)

(52) U.S. Cl.
CPC .............. *G01L 9/0072* (2013.01); *G01D 5/24* (2013.01); *G01L 27/005* (2013.01); *G01L 27/007* (2013.01)

(58) Field of Classification Search
CPC ....... G01L 9/12; G01L 9/0041; G01L 9/0072; G01L 9/0073; G01L 9/0075; G01L 19/00;
(Continued)

(56) References Cited

U.S. PATENT DOCUMENTS 6,581,436 B2   6/2003   Mannhart
7,042,228 B2   5/2006   Lally et al.
(Continued)

FOREIGN PATENT DOCUMENTS

CN       2303289 Y    1/1999
CN     103048087 A    4/2013
(Continued)

*Primary Examiner* — Herbert K Roberts
(74) *Attorney, Agent, or Firm* — Slater Matsil, LLP

(57) ABSTRACT

A sensor arrangement and a method of operating a sensor arrangement are disclosed. In an embodiment, a sensor arrangement includes a pressure sensor realized as a capacitive pressure sensor, a capacitance-to-digital converter, a test circuit and a switching circuit coupling the capacitance-to-digital converter and the test circuit to the pressure sensor.

12 Claims, 11 Drawing Sheets

(51) Int. Cl.
*G01D 5/24* (2006.01)
*G01L 9/00* (2006.01)

(58) Field of Classification Search
CPC ..... G01L 27/00; G01L 27/002; G01L 27/005; G01L 27/007; G05D 5/24; G05D 5/241; G05D 5/2417; G01R 27/2605; G01P 15/125; G01P 21/00
See application file for complete search history.

(56) References Cited

U.S. PATENT DOCUMENTS

| | | |
|---|---|---|
| 9,588,006 B2 | 3/2017 | Heshmati et al. |
| 2007/0080695 A1 | 4/2007 | Morrell et al. |
| 2014/0260508 A1* | 9/2014 | Dar ................. B81C 99/003 73/1.01 |
| 2014/0276139 A1 | 9/2014 | Burkett et al. |
| 2014/0338459 A1 | 11/2014 | Besling et al. |
| 2016/0131550 A1* | 5/2016 | Besling ................. G01L 9/12 702/98 |
| 2019/0129042 A1* | 5/2019 | Yanagisawa ......... B60G 17/018 |

FOREIGN PATENT DOCUMENTS

| | | | | |
|---|---|---|---|---|
| CN | 204142417 U | | 2/2015 | |
| CN | 104807594 A | | 7/2015 | |
| CN | 106289366 A | * | 1/2017 | ........... G01D 18/002 |
| EP | 2796844 A1 | | 10/2014 | |

* cited by examiner

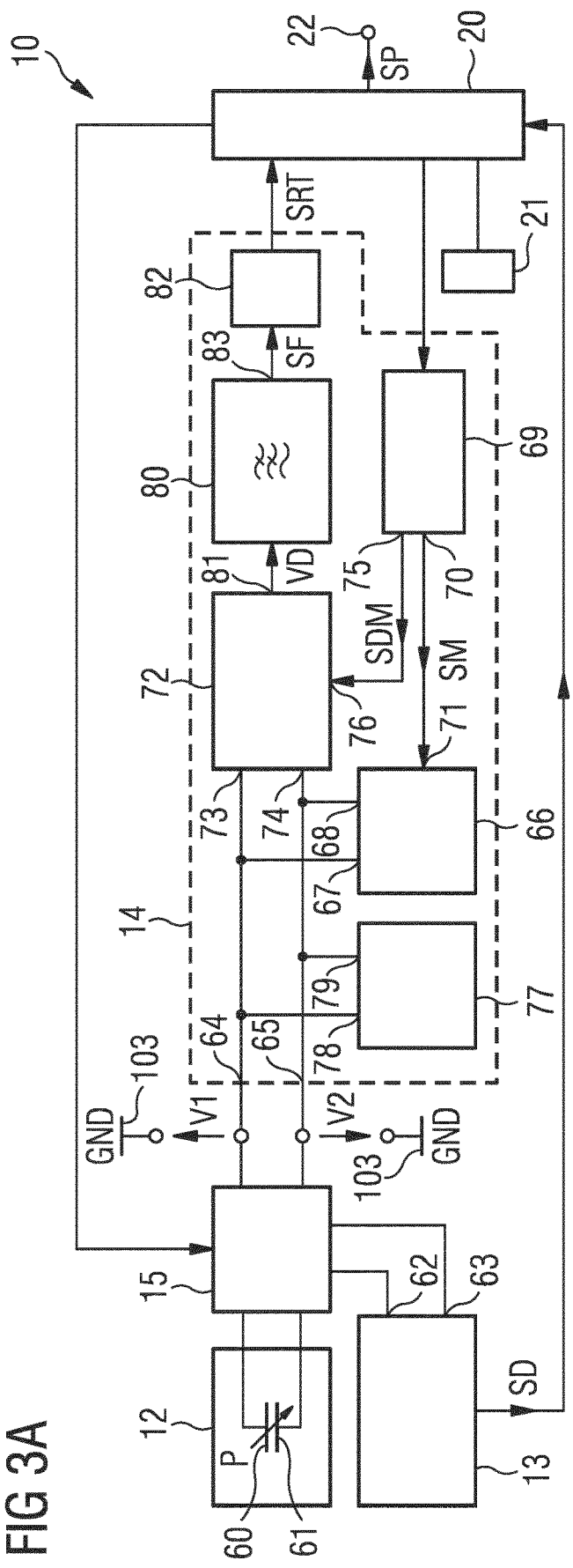

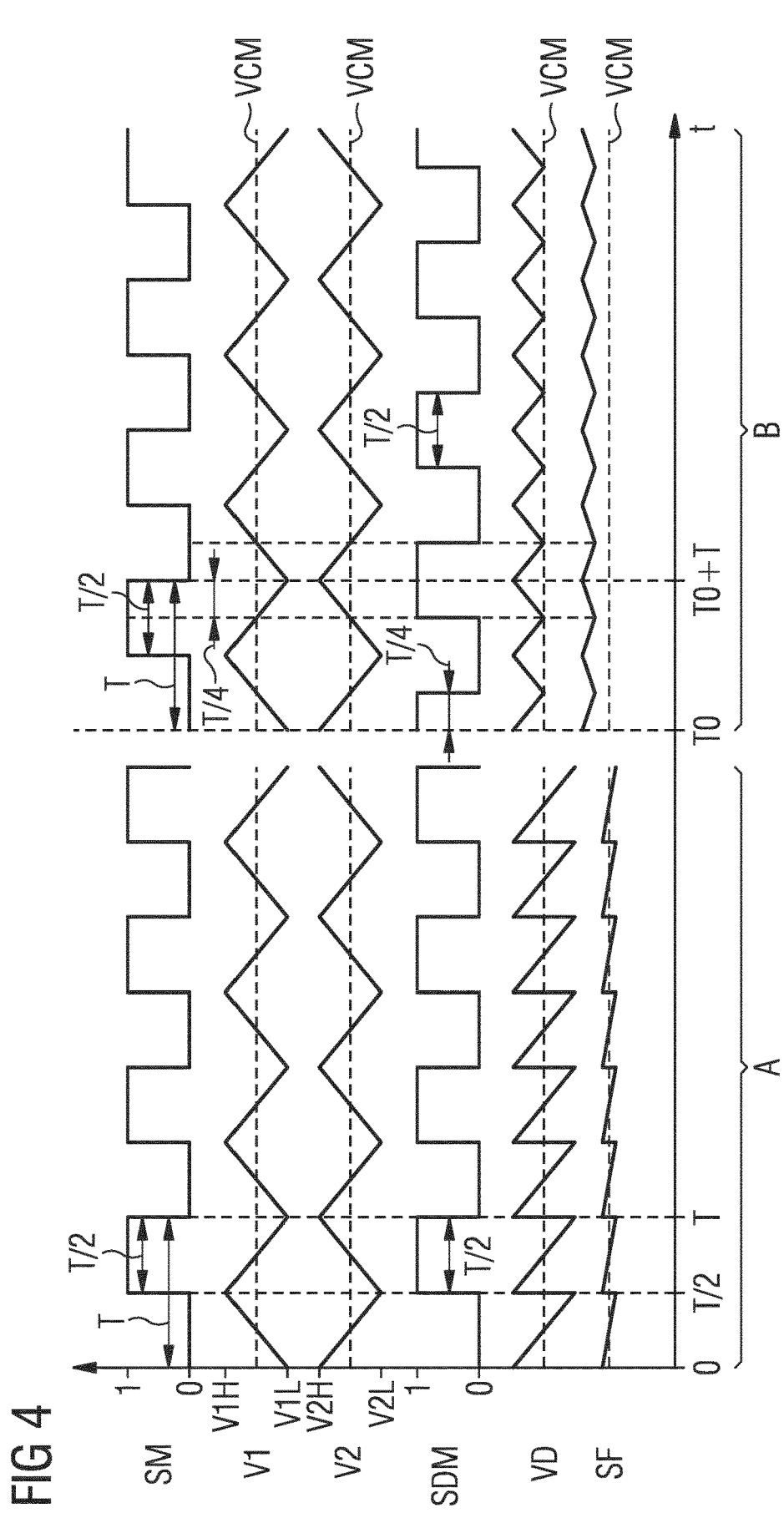

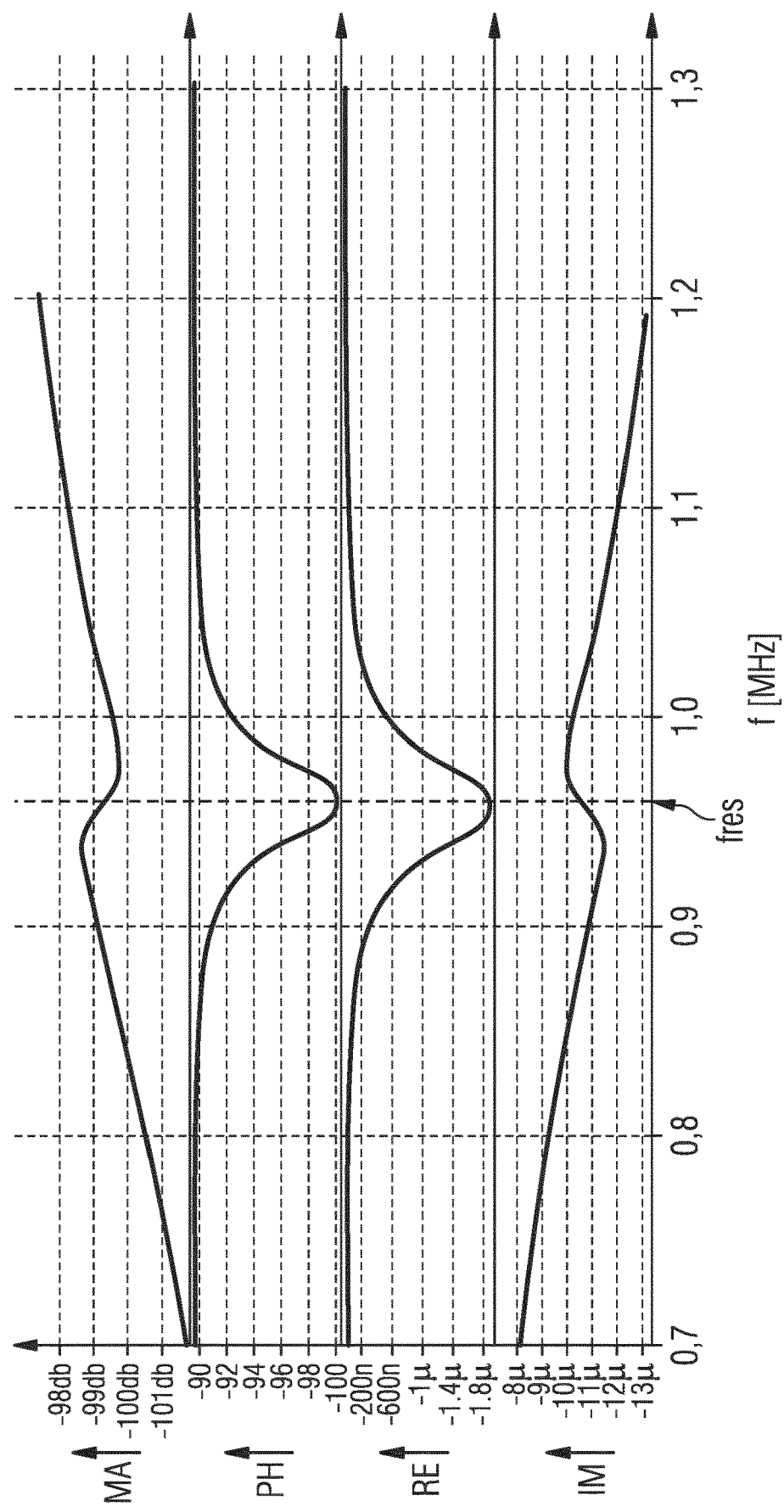

SENSOR ARRANGEMENT AND METHOD OF OPERATING A SENSOR ARRANGEMENT

This patent application is a national phase filing under section 371 of PCT/EP2019/059152, filed Apr. 10, 2019, which claims the priority of European patent application 18174624.9, filed May 28, 2018, each of which is incorporated herein by reference in its entirety.

TECHNICAL FIELD

The present disclosure is related to a sensor arrangement and to a method of operating a sensor arrangement.

BACKGROUND

A sensor arrangement comprises a sensor, for example a pressure sensor. A pressure sensor typically has a membrane. The membrane may be fabricated as a micro-electro-mechanical-system membrane, abbreviated as MEMS membrane. The membrane is deflected in the case of a pressure difference between the two sides of the membrane. A pressure sensor is often realized as a capacitive pressure sensor. Thus, the deflection of the membrane results in a change of a capacitance value of the pressure sensor. Therefore, the pressure sensor is often connected to a capacitance-to-digital converter to generate a digital value that depends on the pressure difference between the two sides of the membrane. The stability and sensitivity of a pressure measurement highly depends on the physical properties of the membrane. These physical properties may be different at different examples of a pressure sensor and may vary during the lifetime of the pressure sensor.

SUMMARY OF THE INVENTION

The definitions as described above also apply to the following description unless otherwise stated.

In an embodiment, a sensor arrangement comprises a pressure sensor, a capacitance-to-digital converter, a test circuit and a switching circuit that couples the capacitance-to-digital converter and the test circuit to the pressure sensor. The pressure sensor is realized as a capacitive pressure sensor.

Advantageously, a measurement of the capacitive pressure sensor can be performed by the capacitance-to-digital converter. The test circuit is designed to gain further information, e.g. correction data, about the pressure sensor. Thus, a digital signal provided by the capacitance-to-digital converter can be corrected using the further information.

In an embodiment, the sensor arrangement comprises a semiconductor body. The semiconductor body comprises at least the pressure sensor, the capacitance-to-digital converter, the test circuit and the switching circuit. The pressure sensor, the capacitance-to-digital converter, the test circuit and the switching circuit are integrated on a first surface of the semiconductor body. The sensor arrangement comprises only a single semiconductor body.

In an alternative embodiment, the sensor arrangement comprises a semiconductor body and a further semiconductor body which together comprise the pressure sensor, the capacitance-to-digital converter, the test circuit and the switching circuit.

In an embodiment, the sensor arrangement comprises a digital circuit coupled to the capacitance-to-digital converter, the test circuit and the switching circuit. The semiconductor body may comprise the digital circuit.

In an embodiment, the sensor arrangement comprises a memory connected to the digital circuit. The semiconductor body may comprise the memory.

In an embodiment, in a test phase of operation, the digital circuit controls the switching circuit such that the test circuit is coupled to the pressure sensor or that the test circuit and the capacitance-to-digital converter are coupled to the pressure sensor.

In an embodiment, in the test phase of operation, the digital circuit controls the switching circuit such that the test circuit is exclusively or only coupled to the pressure sensor, wherein the capacitance-to-digital converter is not coupled to the pressure sensor. Alternatively, in the test phase of operation, the digital circuit controls the switching circuit such that the test circuit and the capacitance-to-digital converter are both coupled to the pressure sensor.

In the test phase of operation, the digital circuit may store correction data in the memory.

In an embodiment, in a measurement phase of operation, the digital circuit controls the switching circuit such that the capacitance-to-digital converter is coupled to the pressure sensor.

In the measurement phase of operation, the digital circuit may provide a digitized pressure signal depending on the digital signal provided by the capacitance-to-digital converter and the correction data stored in the memory.

In an embodiment, in the test phase of operation, the sensor arrangement performs a frequency sweep and determines a resonance frequency of a membrane of the pressure sensor. Optionally, the sensor arrangement determines a quality factor. The quality factor may be equal to a width of the resonance peak.

In an embodiment, the test circuit performs the frequency sweep and generates a test result signal. The digital circuit determines the resonance frequency and optionally also the quality factor depending on the test result signal. The digital circuit determines the correction data depending on the resonance frequency and optionally also on the quality factor.

In an embodiment, the pressure sensor comprises a first and a second electrode. The test circuit comprises a first and a second terminal. The switching circuit couples the first terminal of the test circuit to the first electrode and the second terminal of the test circuit to the second electrode.

In an embodiment, the switching circuit couples a first input of the capacitance-to-digital converter to the first electrode and a second input of the capacitance-to-digital converter to the second electrode.

In an embodiment, the test circuit comprises a current source with a first terminal that is connected to the first terminal of the test circuit and a second terminal that is connected to the second terminal of the test circuit.

In an embodiment, the test circuit comprises a timing generator that is connected to the current source and provides a modulator clock signal to the current source. The current source controlled by the timing generator may operate such as a modulator.

In an embodiment, the test circuit comprises a demodulator circuit with a first input connected to the first terminal of the test circuit and with a second input connected to the second terminal of the test circuit.

In an embodiment, the timing generator is connected to the demodulator circuit and provides a demodulator clock signal to the demodulator circuit.

In an embodiment, the test circuit comprises a filter connected to an output side of the demodulator circuit. The test circuit comprises an analog-to-digital converter connected to an output side of the filter and to an input of a digital circuit.

In an embodiment, the test circuit comprises a bias circuit with a first terminal connected to the first terminal of the test circuit and with a second terminal connected to the second terminal of the test circuit. The bias circuit may be configured to adjust a DC bias voltage of the first electrode and a DC bias voltage of the second electrode.

In an embodiment, in the test phase of operation, the bias circuit provides a source voltage to the first and the second terminal of the bias circuit. Thus, the first and the second electrode of the pressure sensor are set on the same DC potential by the bias circuit.

In an alternative embodiment, in the test phase of operation, the bias circuit applies the source voltage between the first and the second terminal of the bias circuit. Thus, the first electrode and the second electrode of the pressure sensor may have a different DC potential. The difference between the two DC potentials is equal to the source voltage. The capacitance-to-digital converter generates the digital signal as a function of a capacitance value of the pressure sensor. The capacitance value is a function of the value of the source voltage. The digital circuit determines the correction data using the digital signal.

In a further development, the bias circuit generates at least two different values of the source voltage. The capacitance-to-digital converter generates at least two values of the digital signal. The digital circuit determines the correction data depending on the at least two values of the digital signal.

In an embodiment, the sensor arrangement comprises a further pressure sensor. The further pressure sensor may be realized as a further capacitive pressure sensor.

In an embodiment, the switching circuit couples the capacitance-to-digital converter and the test circuit to the further pressure sensor.

In an embodiment, a method of operating a sensor arrangement comprises, in a measurement phase of operation, coupling a capacitance-to-digital converter to a pressure sensor via a switching circuit, and, in a test phase of operation, coupling a test circuit to the pressure sensor or coupling the test circuit and the capacitance-to-digital converter to the pressure sensor via the switching circuit.

The pressure sensor is realized as a capacitive pressure sensor.

In an embodiment, in a further measurement phase of operation, the capacitance-to-digital converter is coupled to a further pressure sensor via the switching circuit.

In an embodiment, in a further test phase of operation, the test circuit is coupled to the further pressure sensor via the switching circuit. Alternatively, in the further test phase of operation, the test circuit and the capacitance-to-digital converter are coupled to the further pressure sensor via the switching circuit.

In an embodiment, in the measurement phase of operation, a digital circuit provides a digitized pressure signal depending on a digital signal provided by the capacitance-to-digital converter and correction data stored in a memory.

In an embodiment, in the test phase of operation, the digital circuit stores correction data in the memory depending on at least one of a test result signal provided by the test circuit and a digital signal provided by the capacitance-to-digital converter.

The method of operating a sensor arrangement may be implemented, for example, by the sensor arrangement according to one of the embodiments defined above. The method of operating a sensor arrangement may be realized as a method for pressure measurement or operating a pressure sensor.

The measurement phase may follow the test phase.

Alternatively, the test phase may follow a previous measurement phase and the measurement phase follows the test phase. Thus, a test phase may be between two measurement phases.

In an embodiment, the sensor arrangement comprises a sensor instead of the pressure sensor. The sensor may be e.g. a micro-electro-mechanical-system sensor (abbreviated MEMS sensor), a capacitance sensor, a capacitive sensor, a physical sensor or a mechanical sensor.

In an embodiment, the sensor arrangement comprises an accelerometer or a gyroscope instead of the pressure sensor. The capacitance-voltage measurement or method and/or the resonance frequency measurement or method work for devices that can be electrostatically actuated. If for example an AC/DC bias voltage can be applied over an electrode embedded in a movable structure and a counter electrode in a fixed structure in a device, such a device can use the methods and circuits described in this disclosure.

In an embodiment, the sensor arrangement (abbreviated arrangement) is configured to measure a resonance frequency of a membrane of the pressure sensor. The arrangement is configured for in-the-field calibration of a pressure sensor. The sensor arrangement may be realized on top of an application specific integrated circuit, shorted ASIC. The sensor arrangement is integrated with the ASIC to reduce cross talk and to reduce foot print and package height.

In an embodiment, a pressure sensor can have a high absolute accuracy of 0.5 mbar at 1000 mbar after calibration. This equals to a relative accuracy of 0.05%. This is a very low value for a mechanical device. This means that small changes in the material properties, external forces and so on can cause a significant shift in the sensor output reading such as the digital signal. Hence, it is desirable to calibrate possible accuracy shifts in-the-field during the lifetime of the pressure sensor. In this disclosure, two methods are described that can be used together or only one of them: the resonance frequency method and the capacitance-voltage method also called the CV method. The capacitance-voltage method may also be named capacitance versus voltage bias method, capacitance versus voltage method, capacitance-voltage bias method or capacitance versus DC bias method, shorted CV method. C-V stands for capacitance-voltage: i.e. the capacitance is a function of an applied bias voltage. In the latter method, a bias voltage is applied over the electrodes which results in electrostatic attraction of the flexible top electrode towards the fixed bottom electrode. Due to electrostatic attraction, the capacitance may be increasing parabolically with the bias voltage. The bias voltage is a DC bias voltage. The bias voltage may be realized as a source voltage. In both methods, the arrangement performs dedicated measurements, called compensation measurements, from time to time to sense changes of the pressure sensor transducer. These changes are responsible for the sensor output shifts. By detecting these changed properties, the arrangement can compensate for them and the output shift is reduced.

In an embodiment, the pressure sensor is inserted in a mobile device and is calibrated in-the-field. The pressure sensor is designed such that the sensor output shift is low. With the proposed method, the residual output shifts may be calibrated away or reduced resulting in a pressure sensor with a constant high absolute accuracy over the complete lifetime.

The sensor output shifts due to small changes in the transducer and or packaging properties. The transducer is a free hanging, suspended membrane on top of a sealed cavity. The cavity pressure is usually very small in the order of a couple of millibar, abbreviated mbar. The outer atmospheric pressure is pressing on the membrane causing it to bend downwards in the direction of a bottom electrode on the other side of the cavity. Inside the membrane is a top electrode and the capacitance between said top electrode and said bottom electrode is measured. The capacitance is directly related to the atmospheric pressure. The membrane properties determine to a large extent the properties of the pressure sensor.

A sensor output shift is mainly caused by a change in the membrane properties. By measuring the changes of the membrane properties e.g. by a compensation measurement in the field using the sensor arrangement, it is possible to compensate the sensor output shift that this changes are causing. Typical, conventional specifications of this drift are in the order of ±1 mbar sensor drift per year. Hence after a lifetime of e.g. 10 years this drift mounts up to be ±10 mbar (=1%). Typical solder drifts for conventional devices are also in the order of ±1 mbar sensor drift. Advantageously, the sensor arrangement and the method for operating the sensor arrangement may compensate for all these drift effects to keep the accuracy within the ±1 mbar accuracy over lifetime. Please note that the sensor drifts that need to be corrected for are small, which justifies to limit the drift compensation to first order effects.

The most important membrane properties are described by the effective membrane stiffness. The effective membrane stiffness is determined by sensor properties like the materials in the membrane layer stack, the lateral size of the membrane, the effective membrane stress and the cavity pressure. Sensor drifts are mainly caused by changes of the effective membrane stiffness. The sensor arrangement detects changes in the effective membrane stiffness so that sensor drifts can be compensated in the field.

The following possible changes of the sensor properties affect the effective membrane stiffness: A change in cavity pressure could be a result from outgassing from surrounding layers or in-diffusion through membrane. A change in the effective stress could be due to stress relaxation in membrane or anchors or stress changes in CMOS back-end Aluminum.

This arrangement may not compensate for e.g. catastrophic failures like membrane breakage or drifts in the analog front end of the ASIC.

The disclosure relates to a pressure sensor that uses a MEMS membrane; the membrane can be modeled as a capacitor plus a series of parasitic elements in parallel. An AC response is measured by applying the alternating bias voltage over the top electrode and the bottom electrode. The membrane can be brought into resonance upon applying the alternating bias voltage over the top electrode and the bottom electrode at the specific characteristic frequency, i.e. the resonance frequency. The AC response shows a peak of resonance whose value is tied to some physical properties of the membrane and the underlying cavity. The resonance frequency is a resonance of membrane properties and cavity properties. Measuring the resonance frequency of the membrane gives information about the membrane stiffness, cavity pressure and pressure sensitivity. Being able to bring the membrane into resonance allows to detect defects and determine whether a membrane is properly released. The information derived from the resonance frequency measurement allows to determine overall transducer yield.

An on-chip resonance measurement circuit allows to determine if unacceptable changes occur in the membrane stress and/or the wafer bow. If the membrane is not hermetic or outgassing occurs into the cavity, the determination of resonance frequency and width of the resonance peak (i.e. the full width at half maximum, shorted FWHM) is useful. Based on this information, the quality factor can be determined. The arrangement allows to perform a frequency sweep over a large frequency range 1 kHz . . . 100 kHz around the natural resonance frequency of the pressure sensitive membrane (700 kHz to 900 kHz).

Measuring the resonance frequency of a pressure sensor membrane gives information on the stiffness of the membrane and the presence of defects. If for instance the resonance frequency is absent, the membrane is not properly released or even ruptured. If the resonance frequency is significant higher, the membrane can be (partially) sticking. If particles or etch residues are remaining in the cavity, the resonance frequency will differ significantly from adjacent devices i.e. the resonance frequency is then typically larger due to the larger mass/stiffness of the membrane. If the membrane is leaky/non-hermetic, the resonance frequency increases as well and can thus be used to detect faulty devices. The resonance frequency is directly related to the mass and the stress in the pressure sensitive membrane.

Changes in the membrane stress can be accurately monitored over time with an on-chip integrated resonance measurement circuit. The membrane stress can change due to several reasons: 1) a change in (wafer) bow due to stress change in plasma-enhanced chemical-vapor-deposition (shorted PECVD) deposited silicon oxide and/or silicon nitride layers used in back-end of line (shorted BEOL) interconnect, 2) an intrinsic stress and/or possibly also a change in elastic modulus of aluminum interconnect layers due to large temperature excursions: aluminum is known to show viscoelastic and even viscoplastic behavior that affects the wafer bow and therefore also the membrane stress, 3) viscoelastic damping by air outside the cavity and or viscoelastic damping by gas trapped inside the cavity: the viscosity of the gas molecules causes energy to be dissipated by means of compression and shear, if gas is present inside the cavity the resonance frequency increases due to a cushioning effect, 4) change in the stress of the membrane stack e.g. compressive stress of the PECVD silicon nitride seal layer can change due to structural rearrangements in the material over time.

The width of the resonance peak allows to determine the quality factor of the resonator. The quality factor is a measure of the damping behavior. A low quality factor indicates that the membrane movement is damped during oscillation e.g. due to the presence of air or gas trapped inside the cavity. The inverse of the quality factor is proportional to the cavity pressure. Outgassing of the cavity (either caused by gas escaping from the cavity as well as gas molecules that are diffusing into the cavity) results in sensor drift. The arrangement is designed to determine the width of the resonance frequency peak.

In an embodiment, the sensor arrangement comprises a capacitance-to-digital converter circuit with four terminals and two pressure sensors. The two pressure sensors have pressure sensitive membranes. In the test phase of operation, the membranes of the two pressure sensors being connected in parallel may be tested by the sensor arrangement. If the two pressure membranes are connected in parallel to the resonance excitation circuit, two resonance peaks will emerge that will partially overlap depending on the individual stress states of the two membranes. The arrangement performs a frequency sweep and allows to discriminate the peak positions of the two resonance frequency peaks. Due to damping, the resonance frequencies will partially overlap. Without frequency sweep, the determination of the full width half maximum may yield erroneous results. The arrangement is designed to determine a plurality of resonance frequencies in case multiple capacitive pressure sensor membranes are used.

In an embodiment, the test circuit is connected to exactly one pressure sensor. The pressure sensor comprises exactly one membrane. Thus, one single membrane is connected to the resonance frequency circuit. The test circuit is connected to one single membrane, even if multiple membranes are used for the capacitance-to-digital converter.

The test circuit may be coupled to exactly one pressure sensor via the switching circuit. The pressure sensor comprises exactly one membrane. In the test phase of operation, the exactly one membrane is tested by the sensor arrangement. The exactly one membrane is tested alone in the test phase.

Advantageously, performing a frequency sweep is easier as to bring a membrane into oscillation. With a simple oscillator circuit, the membrane can be brought into oscillation, if the resonance frequency is known upfront. If large shifts occur or if the quality factor is low, it becomes difficult to excite the membrane if the membrane is not excited at the exact frequency. However, upon analyzing the results over frequency, it is possible to obtain the quality factor in addition to the resonance frequency. Using the arrangement, it is possible to optimize the yield by measuring the membrane characteristics at wafer sort. The arrangement allows to verify defects in the membrane at wafer sort, before assembling the product and calibrating it. In case the product is sold as good-known-die, it can significantly increase the fault coverage. The sensor arrangement is configured to recalibrate the device in the field taking into account the deltas in the resonance frequency and quality factor.

The frequency method and CV method add in between calibration to the pressure sensor. Advantageously, an accurate pressure reference may not be needed, such as e.g. a second pressure sensor. Hence, drift correction can be done in the field. The pressure sensor is kept more accurate. No internet access or GPS data is required for the calibration method. So the method will also work in devices without such functionality. Here the already existing bottom and top electrode are used to apply an additional force. The resonance frequency allows to monitor stress changes as well as cavity pressure changes. The method improves accuracy of the arrangement in field and compensates slight drift. No additional external input may be required.

The sensor arrangement is implemented as a circuit that applies a stimulus at a certain frequency and then synchronously demodulates the response in order to extract the in-phase component and the quadrature component at this frequency. The sensor arrangement may be realized as an embedded integrated circuit that performs a frequency sweep that derives the resonance frequency response as well as the width of the resonance frequency peaks for a plurality of membranes. The arrangement is realized as an electrical circuit that is able to determine the resonance frequency of a capacitive pressure sensor membrane using a frequency sweep of the clock signals in both the 0° and 90° mode of operation.

BRIEF DESCRIPTION OF THE DRAWINGS

The following description of figures of embodiments may further illustrate and explain aspects of the sensor arrangement and the method of operating a sensor arrangement. Devices and circuit parts with the same structure and the same effect, respectively, appear with equivalent reference symbols. In so far as devices or circuit parts correspond to one another in terms of their function in different figures, the description thereof is not repeated for each of the following figures.

FIGS. 3A to 3E show a further example of an embodiment of a sensor arrangement;

FIG. 4 shows an example of signals of a sensor arrangement;

FIGS. 5A and 5B show an example of simulation results of a sensor arrangement;

DETAILED DESCRIPTION OF ILLUSTRATIVE EMBODIMENTS

Figure 1A:
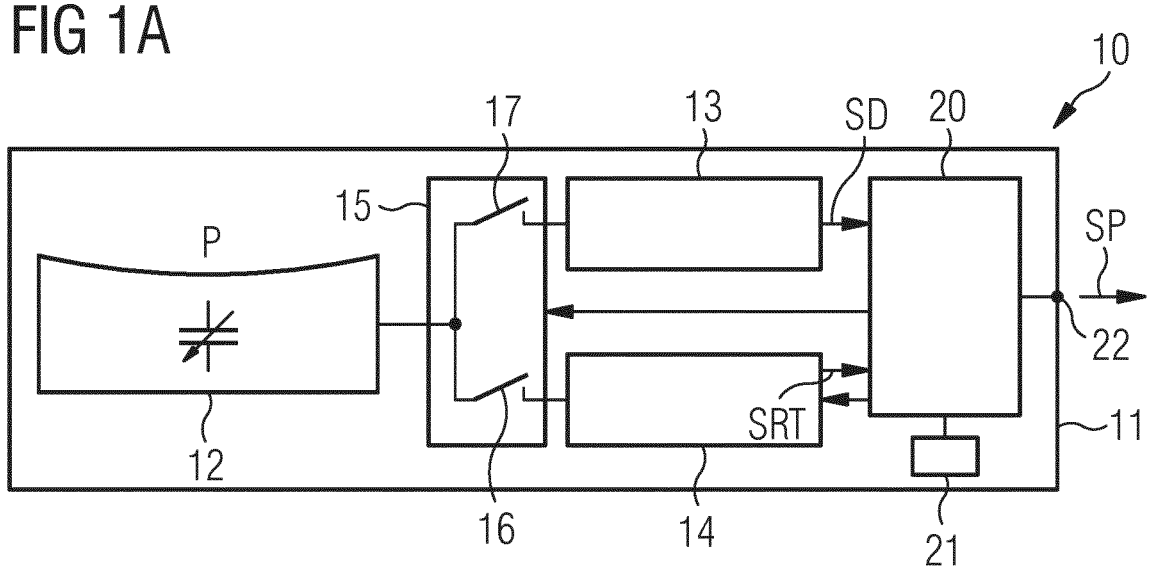
FIGS. 1A to 1C show examples of an embodiment of a sensor arrangement.

FIG. 1A shows an example of an embodiment of a sensor arrangement 10. The sensor arrangement 10 (abbreviated as arrangement) is realized on a semiconductor body 11. The sensor arrangement 10 comprises a pressure sensor 12 that is realized as a capacitive pressure sensor 12 and is abbreviated as sensor. Thus, the sensor arrangement 10 is realized as pressure sensor arrangement. Moreover, the arrangement 10 comprises a capacitance-to-digital converter 13, a test circuit 14 and a switching circuit 15. The capacitance-to-digital converter 13 can be abbreviated as converter. The converter 13 is coupled via the switching circuit 15 to the sensor 12. The test circuit 14 is coupled via the switching circuit 15 to the sensor 12.

The switching circuit 15 comprises a first switch 16. The first switch 16 couples the test circuit 14 to the sensor 12. A second switch 17 of the switching circuit 15 couples the converter 13 to the sensor 12. The arrangement 10 comprises a digital circuit 20 that is connected to the converter 13 and to the test circuit 14. The digital circuit 20 is connected to a control terminal of the switching circuit 15 and thus to the control terminals of the first switch 16 and of the second switch 17. The arrangement 10 comprises a memory 21 that is connected to the digital circuit 20.

In a measurement phase M of operation, the digital circuit 20 controls the switching circuit 15 such that the converter 13 is connected to the sensor 12. The test circuit 14 is not connected to the sensor 12 in the measurement phase M of operation. The converter 13 provides a digital signal SD. The digital signal SD depends on the capacitance of the sensor 12. A pressure P is provided to a membrane of the sensor 12. The digital signal SD is a function of a pressure difference between a front side of the membrane and a back side of the membrane. The digital signal SD is provided by the converter 13 to the digital circuit 20. The digital circuit 20 generates a digitized pressure signal SP and provides the digitized pressure signal SP at an output 22 of the arrangement 10.

In a test phase T of operation, the digital circuit 20 controls the switching arrangement 15 such that the test circuit 14 is connected to the sensor 12. The converter 13 may be disconnected from the sensor 12 in the test phase T of operation. The test circuit 14 is controlled by the digital circuit 20. The test circuit 14 may generate a test result signal SRT and provides it to the digital circuit 20. The test result signal SRT may depend on a parameter measured during the test phase T of operation at the sensor 12. The digital circuit 20 generates data and stores it as correction data in the memory 21. The correction data depend on the test result signal SRT. In a measurement phase M of operation following the test phase T of operation, the digitized pressure signal SP is provided as a function of the digital signal SD and of the correction data stored in the memory 21.

In an alternative embodiment, in the test phase T of operation, the digital circuit 20 controls the switching circuit 15 such that the converter 13 and the test circuit 14 are both connected to the sensor 12. Thus, the test circuit 14 may provide a test signal to the sensor 12. The converter 13 measures the capacitance of the sensor 12 that is influenced by the test signal. The converter 13 provides the digital signal SD to the digital circuit 20. The digital circuit 20 stores the correction data as a function of the digital signal SD in the memory 21.

In an embodiment, the digital circuit 20 provides the last value of the digitized pressure signal SP measured in the last measurement phase during the test phase following the last measurement phase. Thus, there is no interruption of the digitized pressure signal SP.

The arrangement 10 performs the compensation measurements regularly to track sensor output drifts and to compensate for it. During these measurements, the sensor 12 is powered up but it cannot perform normal measurements and hence cannot produce a new value of the digitized pressure signal SP. Since the measurement of the membrane properties may take several tens of milliseconds (and longer), the interruption of the sensor output SP may be noticeable by the application and the customer. Hence, the compensation measurements are performed from time to time and there are no pressure readings possible during the compensation measurement. Optionally, the sensor arrangement 10 may use the last measured value for providing the digitized pressure signal SP. Alternatively, the final application triggers the compensation routine externally in regular intervals. In case the arrangement 10 receives the information when a new pressure reading is requested, it may plan the compensation measurements in a time window where no readings are requested.

In an embodiment, the resonance frequency method uses the arrangement 10 that comprises ASIC building blocks. The arrangement 10 is designed to measure a resonance frequency fres of the membrane. Additional building blocks need to be added to the ASIC to enable the functionality of this compensation method: Hence, building blocks such as the test circuit 14 and the switching circuit 15 with a low-capacitance switch are added to the converter 13. The test circuit 14 is implemented as resonance frequency building block and generates the DC and AC voltage which are controlled by the digital circuit 20. These building blocks determine the resonance frequency fres and the digital block 20 performs the calculation.

During a test, the resonance frequency fres at a zero point of time is determined and stored in the memory 21. The test may be a final test, such as e.g. esort wafer test, e-sort wafer test and or final production test, or may be a test phase as described above. The correlation between a change of the resonance frequency fres and the resulting sensor output shift is predetermined and stored in the memory 21 as a look-up-table or as a function with calibration constants stored in memory. During the compensation measurements in the field, the resonance frequency fres is determined and updated in the memory 21. From the change of the resonance frequency fres, the sensor output shift is compensated.

Frequency of the compensation measurements: The compensation measurements are performed at predetermined intervals. The intervals can be shortened with increasing lifetime of the sensor arrangement 10 or if the sensor output shift is increasing. The compensation measurement may be triggered by the end-application because a real time clock is advantageous to keep track of the passed time. Also the end-application can take into account that during the compensation measurement no pressure reading is possible. The compensation measurement can also be performed in case a very accurate pressure reading is desired. Since the sensor output drift can be in the order of 1 mbar per year without compensation, it is sufficient to perform this measurement once per day or less often. A compensation run of at least once per month may be recommended to ensure the sensor accuracy and to detect the onset of strong sensor drift. The resonance frequency method may take only several tens of milliseconds.

Figure 1B:
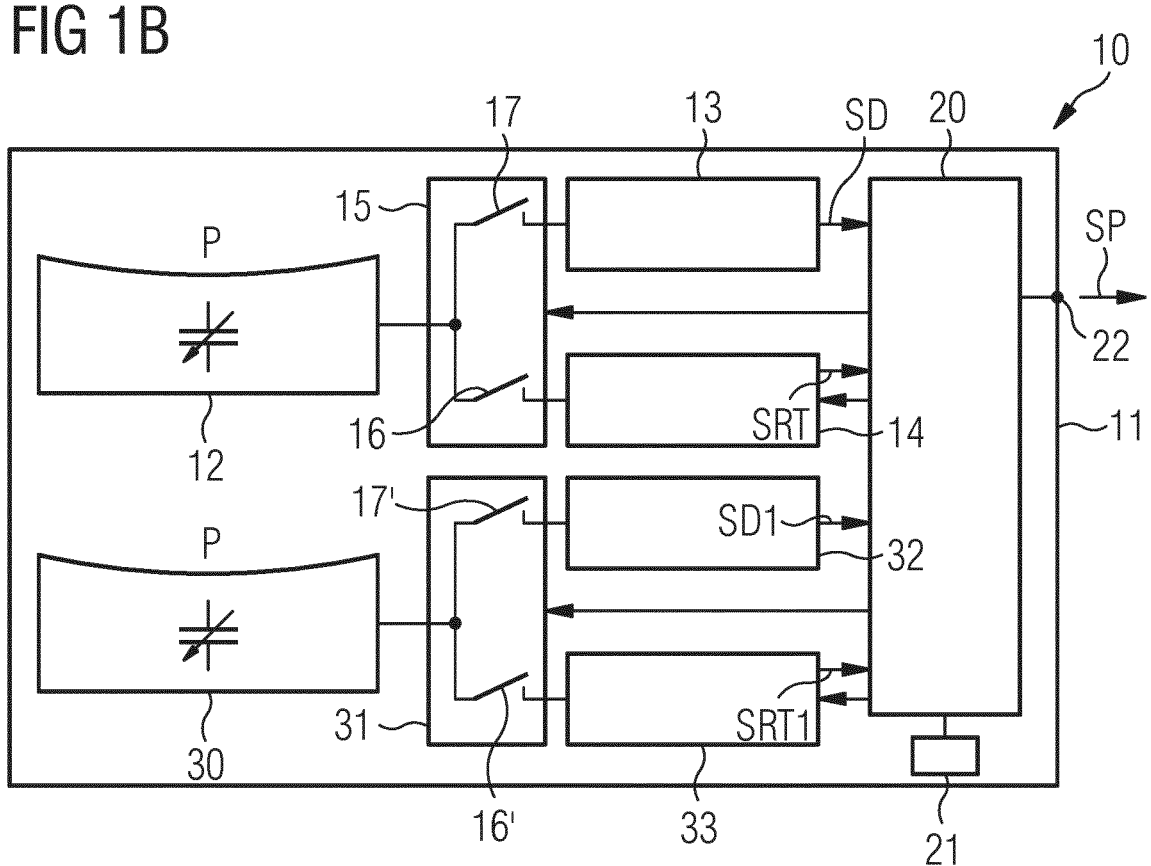

FIG. 1B shows a further example of an embodiment of the sensor arrangement 10 that is a further development of the embodiment shown in Figure iA. The sensor arrangement 10 comprises a further pressure sensor 30, realized as a further capacitive pressure sensor and abbreviated as further sensor. Moreover, the arrangement 10 comprises a further switching arrangement 31, a further capacitance-to-digital converter 32, abbreviated as further converter. The arrangement 10 comprises a further test circuit 33. The further test circuit 33 and the further converter 32 are coupled via the further switching circuit 31 to the further sensor 30. The digital circuit 20 is connected to the further converter 32 and to the further test circuit 33. Moreover, the digital circuit 20 is connected to the further switching circuit 31. The further switching arrangement 31 is realized such as the switching circuit 15. The further converter 32 is implemented such as the converter 13. The further test circuit 33 is realized such as the test circuit 14. The semiconductor body 11 may comprise the further sensor 30, the further switching arrangement 31, the further converter 32 and the further test circuit 33.

In the measurement phase M of operation, the digital circuit 20 sets the further switching circuit 31 such that the further converter 32 is connected to the further sensor 30 and the further test circuit 33 is disconnected from the sensor 30. The further converter 32 generates a further digital signal SD1 that is provided to the digital circuit 20. The digital circuit 20 generates a digitized pressure signal SP as a function of the digital signal SD and of the further digital signal SD1. The digitized pressure signal SP may be named sensor output.

In the test phase T of operation, the digital 20 controls the further switching circuit 31 such that the further test circuit 33 is connected to the further sensor 30. The further converter 32 may be disconnected from the further sensor 30.

Alternatively, in the test phase T of operation the digital circuit 20 controls the switching arrangement 31 such that the further test circuit 33 and the further converter 32 are both connected to the further sensor 30.

The sensor 12 and the further sensor 30 may be realized as identical sensors. The pressure P provided to the membrane of the sensor 12 may be equal to a pressure provided to a membrane of the further sensor 30. Thus, in principle the digital signal SD and the further digital signal SD1 may be identical. A difference in these two signals SD, SD1 may indicate that the sensor 12 or the further sensor 30 has a deteriorated characteristic such as a failure in the membrane. The digital circuit 20 may recognize such a difference of the digital signal SD and of the further digital signal SD1 and trigger the start of a test phase T of operation. In the test phase T of operation, the digital circuit 20 determines which of the two sensors, the sensor 12 or the further sensor 30, operates in a sufficient manner and which signal, the digital signal SD or the further digital signal SD1, should be used to generate the digitized pressure signal SP. The digitized pressure signal SP will not depend on the other digital signal SD, SD1 that is generated by means of the sensor that has a failure.

The measurement of the sensor 12 and of the further sensor 30 may be simultaneously performed. Also the test of the sensor 12 and of the further sensor 30 may be simultaneously performed. The measurement of the two sensors 12, 30 is performed at the same external pressure P. Thus, the test of the two sensors 12, 30 is performed at an identical pressure.

The arrangement 10 performs a resonance frequency measurement. The arrangement 10 comprises two membranes. The arrangement 10 may perform a self-test. The capacitance-to-digital converter 13 is using two membranes to allow for a differential capacitance measurement. The resonance frequency circuit that is embedded in the arrangement 10 will be connected to one of the membranes to perform a measurement of the resonance frequency fres. A second resonance frequency measurement is performed on the other membrane. The difference of the resonance frequencies is typically very small due to the good matching of the two membranes. If they are not properly matched, the device can be deselected during e-sort. E.g. the resonance frequency fres may shift because of a leaky membrane. The resonance frequency fres is a slight function of the ambient pressure P. Therefore, in the field it is difficult to relate shifts of the resonance frequency fres to leaky membranes. However, looking at the difference of the two resonance frequencies the method checks if one of the membranes has deteriorated with respect to the other.

Figure 1C:
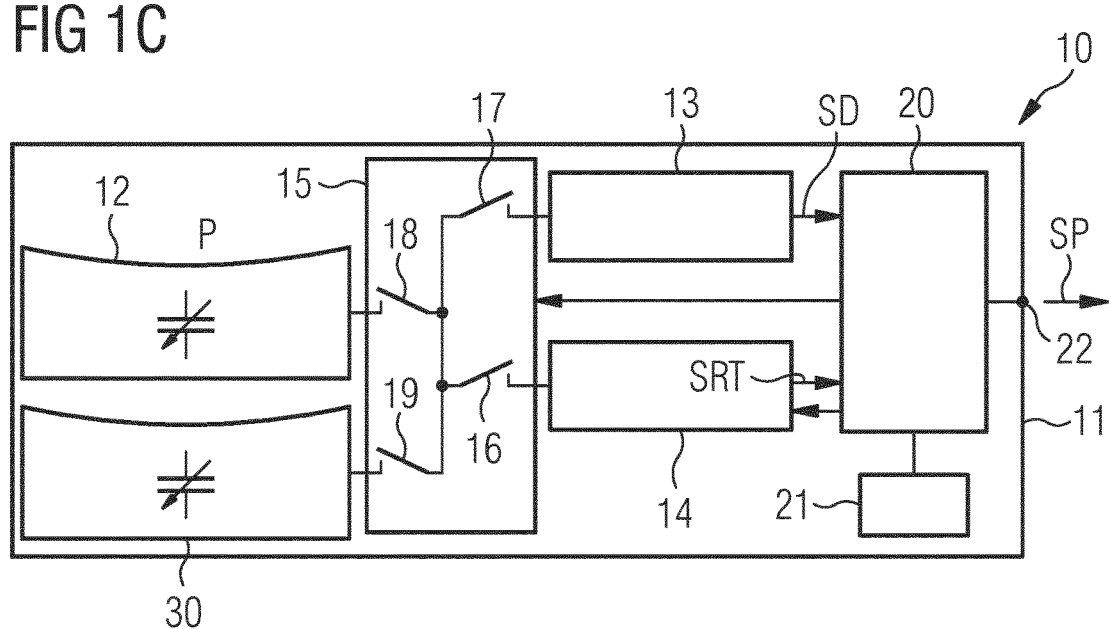

FIG. 1C shows an example of an embodiment of the sensor arrangement 10 that is a further development of the embodiments shown in FIGS. 1A and 1B. The further sensor 30 is connected to the switching circuit 15. Thus, the converter 13 and the test circuit 14 are both coupled via the switching circuit 15 to the further sensor 30. The switching circuit comprises a third and a fourth switch 18, 19. The semiconductor body 11 may comprise the further sensor 30.

The measurement phase M of operation may be divided in a first measurement phase M1 and in a second measurement phase M2. In the first measurement phase M1, the converter 13 is connected to the sensor 12 via the switching circuit 15 (e.g. via the second and the third switch 17, 18). In the second measurement phase M1, the converter 13 is connected to the further sensor 30 via the switching circuit 15 (e.g. via the second and the fourth switch 17, 19).

The test phase T of operation may also be divided in a first test phase T1 and a second test phase T2. In the first test phase T1, the test circuit 14 is connected to the sensor 12 via the switching circuit 15 (e.g. via the first and the third switch 16, 18). In the second test phase T2, the test circuit 14 is connected to the further sensor 30 (e.g. via the first and the fourth switch 16, 19). The converter 13 is disconnected from the sensor 12 and the further sensor 30 in the first and the second test phase T1, T2.

Alternatively, the converter 13 is connected to the sensor 12 in the first test phase T1 and the converter 13 is connected to the further sensor 30 in the second test phase T2. Advantageously, the number of circuits on the semiconductor body 11 is reduced in comparison to the circuits shown in FIG. 1B.

Figure 2:
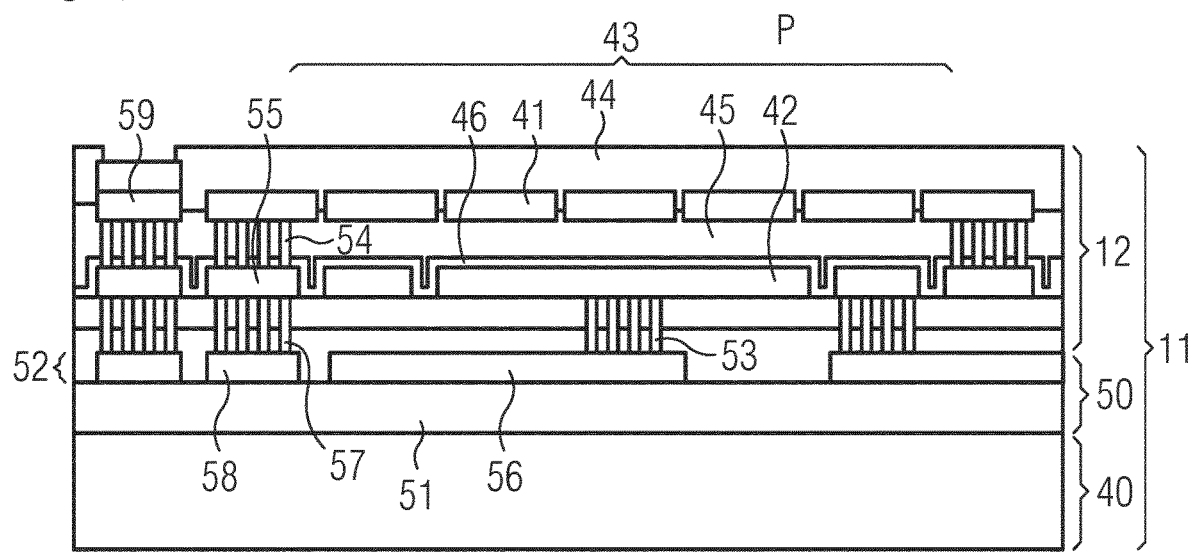
FIG. 2 shows an example of a pressure sensor.

FIG. 2 shows an example of an embodiment of the sensor 12 that is realized in the arrangements 10 shown in FIGS. 1A to 1C. The sensor 12 can be called capacitive pressure transducer. The semiconductor body 11 comprises a semiconductor substrate 40. The sensor 12 is realized on top of the semiconductor substrate 40. The sensor 12 comprises a top and a bottom electrode 41, 42. The top electrode 41 may be implemented as a top metal electrode. The bottom electrode 42 may be implemented as a bottom metal electrode. The sensor 12 comprises a membrane 43. The membrane 43 comprises the top electrode 41. Moreover, the membrane 43 comprises a dielectric layer 44. The dielectric layer 44 may be arranged on top of the top electrode 41. The dielectric layer 44 may be fabricated as a passivation sealing layer.

The sensor 12 comprises a cavity 45. The cavity 45 is between the top electrode 41 and the bottom electrode 42. The top electrode 41 is between the cavity 45 and the dielectric layer 44. The sensor 12 may comprise a further dielectric layer 46. The further dielectric layer 46 may be realized as an etch stop layer. The further dielectric layer 46 is arranged between the bottom electrode 42 and the cavity 45. The cavity 45 is fabricated by etching of a sacrificial layer (not shown in FIG. 2).

The semiconductor body 11 comprises a metallization stack 50. The metallization stack 50 comprises a first dielectric layer 51 and a first metallization layer 52. The metallization stack 50 may comprise further metallization layers and further dielectric layers not shown in FIG. 2. A part 56 of the first metallization layer 52 is connected by a via 53 to the bottom electrode 42. The top electrode 41 is also connected by a first via 54 to a metal layer 55. The metal layer 55 is connected by a second via 57 to a further part 58 of the metallization layer 52.

The semiconductor body 11 comprises the sensor 12 and an integrated circuit. The arrangement 10 may be realized as a device. The integrated circuit is realized by the semiconductor substrate 40 and the metallization stack 50. The parts 52, 58 of the metallization layer are connected to the integrated circuit. The integrated circuit comprises the circuits shown in FIGS. 1A to 1C, 3A to 3E and 8 such as e.g. the converter 13, the test circuit 14, the switching circuit 15, the digital circuit 20 and the memory 21. The integrated circuit is realized as a complementary metal-oxide-semiconductor circuit, shorted as CMOS circuit. The semiconductor body 11 comprises a bond pad 59 e.g. for providing the digitalized pressure signal SP. The integrated circuit may be designed as an ASIC. The semiconductor body 11 is realized as a die. The arrangement 10 is integrated on one die. The arrangement 10 is integrated on top of a complementary metal-oxide-semiconductor die, shorted CMOS die.

The not shown sacrificial layer is etched through holes in the top electrode 41. After removal of the sacrificial layer, the holes are closed by the dielectric layer 44. The borders of the cavity 45 are defined on the top by the top electrode 41 and the dielectric layer 44 filling the holes of the top electrode 41, on the bottom by the further dielectric layer 46 and at the sides by the via 54. The thickness of the membrane 43 is equal to the sum of the thickness of the top electrode 41 and of the thickness of the dielectric layer 44 on top of the top electrode 41. An area of the membrane 43 is defined by the via 54. The via 54 encircles the cavity 45. The further sensor 30 may be realized such as the sensor 12.

In an alternative embodiment, the sensor 12 and the further sensor 30 may be different. For example, an area of the membrane of the sensor 12 may be different from an area of a membrane of the further sensor 30. The layers 41, 44 forming the membrane 43 of the sensor 12 may be equal to the layers 41, 44 forming the membrane of the further sensor 30.

In an alternative embodiment, not shown, the semiconductor body 11 comprises the sensor 12 and the integrated circuit. The integrated circuit comprises a subset of the circuits shown in FIGS. 1A to 1C, 3A to 3E and 8 such as e.g. the converter 13 and the switching circuit 15. A further semiconductor body comprises e.g. the test circuit 14, the digital circuit 20 and the memory 21.

In an alternative embodiment, not shown, the semiconductor body 11 comprises the sensor 12 and is free of any integrated circuit. A further semiconductor body comprises e.g. the converter 13, the switching circuit 15, the test circuit 14, the digital circuit 20 and the memory 21.

FIG. 3A shows an example of an embodiment of the sensor arrangement 10 that is a further development of the above-shown embodiments. The sensor 12 comprises different terminals. In FIG. 3A, two terminals of the sensor 12 are shown which are connected to a first and a second electrode 60, 61. The first electrode 60 may be realized as the top electrode 41 and the second electrode 61 may be realized as the bottom electrode 42, shown in FIG. 2. Alternatively, the first electrode 60 may be realized as the bottom electrode 42 and the second electrode 61 may be realized as the top electrode 41, shown in FIG. 2. The first and the second electrode 6o, 61 are connected to the switching circuit 15.

The converter 13 is realized as a capacitance measurement circuit. The converter 13 comprises a first and a second input 62, 63 that are connected to the switching circuit 15. The switching circuit 15 couples the first and the second input 62, 63 of the converter 30 to the first and the second electrode 60, 61. The test circuit 14 comprise a first and a second terminal 64, 65 that are connected to the switching circuit 15. The switching circuit 15 couples the first and the second terminal 64, 65 of the test circuit 14 to the first and the second electrode 60, 61.

The test circuit 14 comprises a current source 66. The current source 66 comprises a first and a second terminal 67, 68. The first terminal 67 of the current source 66 is connected to the first terminal 64 of the test circuit 14. Similarly, the second terminal 68 of the current source 66 is connected to the second terminal 65 of the test circuit 14. Furthermore, the test circuit 14 comprises a timing generator 69 having a first output 70 connected to a control input 71 of the current source 66.

The test circuit 14 comprises a demodulator circuit 72. The demodulator circuit 72 comprises demodulator switches. The demodulator circuit 72 has a first and a second input 73, 74. The first input 73 of the demodulator circuit 72 is connected to the first terminal 64 of the test circuit 14. The second input 74 of the demodulator circuit 72 is connected to the second terminal 65 of the test circuit 14. The timing generator 69 comprises a second output 75 that is connected to a control input 76 of the demodulator circuit 72.

Additionally, the test circuit 14 comprises a bias circuit 77 having a first and a second terminal 78, 79. The first terminal 78 of the bias circuit 77 is connected to the first terminal 64 of the test circuit 14. The second terminal 79 of the bias circuit 77 is connected to the second terminal 65 of the test circuit 14.

Furthermore, the test circuit 14 comprises a filter 80 connected to an output 81 of the demodulator circuit 72. The filter 80 may be realized as a low-pass filter. The test circuit 14 comprises an analog-to-digital converter 82, abbreviated as AD converter. An input of the AD converter 82 is coupled to an output 83 of the filter 80. An output of the AD converter 82 is connected to an input of the digital circuit 20. The digital circuit 20 is connected to an input of the timing generator 69 and optionally also to the control terminal of the switching circuit 15. Moreover, an output of the converter 13 is connected to the digital circuit 20.

In the measurement phase M of operation, the converter 13 is connected to the sensor 12 via the switching circuit 15. Thus, the first and the second inputs 62, 63 of the converter 13 are conductively connected to the first and the second electrode 60, 61 by the switching circuit 15. The test circuit 14 is not connected to the sensor 12 via the switching circuit 15 in the measurement phase M of operation.

The converter 13 generates the digital signal SD as a function of a capacitance value between the first and the second electrode 60, 61. The digital signal SD is provided to the digital circuit 20.

In the test phase T of operation, the first and second terminals 64, 65 of the test circuit 14 are conductively connected to the first and second electrode 60, 61 of the sensor 12 by the switching circuit 15. In the test phase T of operation, the converter 13 is not connected to the sensor 12 via the switching circuit 15. The timing generator 69 generates a modulator clock signal SM at the first output 70. Thus, at the control input 71 of the current source 66 the modulator clock signal SM is tapped. The timing generator 69 generates a demodulator clock signal SDM at the second output 75. Thus, at the control input 76 of the demodulator circuit 72 the demodulator clock signal SDM is tapped. A first voltage V1 is tapped at the first terminal 64 of the test circuit 14. The first voltage V1 is equal to a voltage at the first terminal 78 of the bias circuit 77, equal to a voltage at the first terminal 67 of the current source 66 and equal to a voltage at the first input 73 of the demodulator circuit 72. A second voltage V2 is tapped at the second terminal 65 of the test circuit 14. The second voltage V2 is equal to a voltage at the second terminal 79 of the bias circuit 77, at the second terminal 68 of the current source 66 and also at the second input 74 of the demodulator circuit 72. The demodulator 72 generates a demodulated voltage VD as a function of the first and the second voltage V1, V1 and the demodulator clock signal SDM and provides the demodulated voltage VD to the filter 80. The filter 80 generates a filtered signal SF as a function of the demodulated voltage VD and provides the filtered signal SF to the AD converter 82. The AD converter 82 generates the test result signal SRT depending on the filtered signal SF and provides it to the digital circuit 20. The operation of the test circuit 14 is further explained by FIGS. 3B to 3E and 4.

The semiconductor body 11 is realized as a die. The arrangement 10 is integrated on one die. The arrangement 10 is integrated on top of a complementary metal-oxide-semiconductor die, shorted CMOS die.

The arrangement 10 may be fabricated in variations: The low pass filter 80 and acquisition of filter output SF can be inside the semiconductor body 11 or outside, e.g. as part of a test equipment. The arrangement 10 may be applied to other types of sensors for which the AC response may be useful.

Figure 3B:
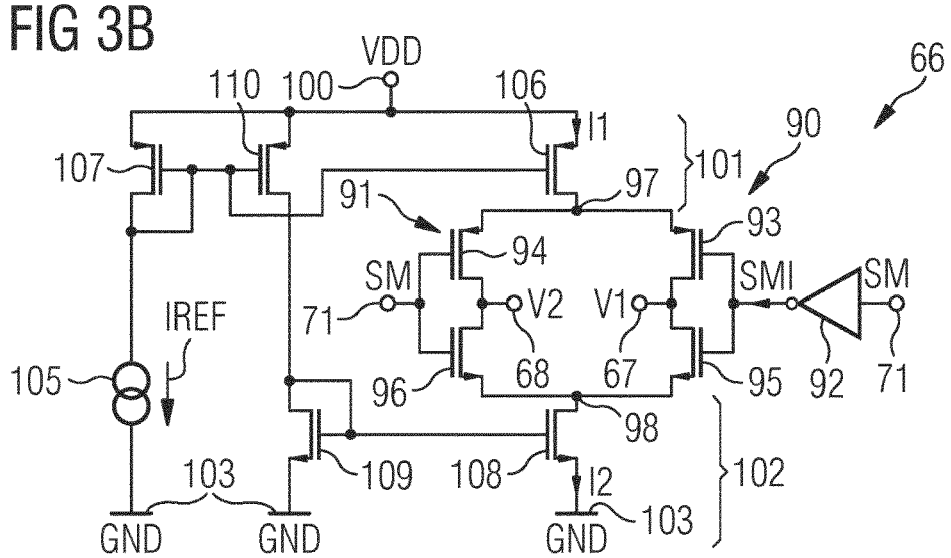

FIG. 3B shows an example of an embodiment of the current source 66 that can be used e.g. in the arrangement 10 shown in FIG. 3A. The current source 66 is configured to provide current and to draw current at the first terminal 67. The current source 66 is also designed to provide current and to draw current at the second terminal 68 of the current source 66. Thus, the current source 66 is realized as a bipolar current source. The current source 66 comprises a first and a second inverter 90, 91. The output of the first inverter 90 is connected to the first terminal 67 of the current source 66 and the output of the second inverter 91 is connected to the second terminal 68 of the current source 66. The control inputs of the first and the second inverter 90, 91 are coupled to the control input 71 of the current source 66. The control input 71 of the current source 66 is connected to the control input of the second inverter 91. The control input 71 of the current source 66 is coupled via a third inverter 92 to the control input of the first inverter 90.

The first and the second inverter 90, 91 each comprise a p-channel field-effect transistor 93, 94, abbreviated P-FET and an n-channel field-effect transistor 95, 96, abbreviated N-FET. The first and the second inverter 90, 91 are connected in parallel. The first inverter 90 couples a first node 97 to a second node 98. The second inverter 91 couples the first node 97 to the second node 98. A supply voltage terminal 100 is coupled via a first current source 101 to the first node 97. The second node 98 is coupled via a second current source 102 to a reference potential terminal 103. The first and the second current source 101, 102 are realized as current mirrors that are connected together.

The current source 66 comprises a reference current source 105 that is connected to the first and the second current source 101, 102. The reference current source 105 controls a first current I1 flowing through the first current source 101 and a second current I2 flowing through the second current source 102. The first current source 101 comprises a first and a second mirror transistor 106, 107 forming a current mirror. The first mirror transistor 106 couples the supply voltage terminal 100 to the first node 97. The second mirror transistor 107 couples the supply voltage terminal 100 to the reference current source 105. The reference current source 105 is connected to the reference potential terminal 103. A control terminal of the second mirror transistor 107 is connected to a control terminal of the first mirror transistor 106 and to a node between the second mirror transistor 107 and the reference current source 105. Thus, the first current I1 is controlled by the reference current source 105.

The second current source 102 comprises a third, a fourth and a fifth mirror transistor 108 to 110. The third mirror transistor 108 couples the second node 98 to the reference potential terminal 103. The third and the fourth mirror transistor 108, 109 each have a first terminal connected to the reference potential terminal 103. A control terminal of the fourth mirror transistor 109 is connected to a control terminal of the third mirror transistor 108 and to a second terminal of the fourth mirror transistor 109. Thus, the third and the fourth mirror transistor 108, 109 form a second current mirror. The second terminal of the fourth mirror transistor 109 is coupled via the fifth mirror transistor 110 to the supply voltage terminal 100. A control terminal of the fifth mirror transistor 110 is connected to the control terminal of the first mirror transistor 106. The second current I2 is also controlled by the reference current source 105.

The first, second and fifth mirror transistor 106, 107, 110 are fabricated as P-FETs. The third and the fourth mirror transistor 108, 109 are fabricated as N-FETs.

A reference current IREF flows through the reference current source 105. A supply voltage VDD is tapped at the supply voltage terminal 100. A first current I1 flows from the supply terminal 100 through the first mirror transistor 106 to the first node 97. A second current I2 flows from the second node 98 via the third mirror transistor 108 to the reference potential terminal 103. The value of the first current I1 may be equal to the value of the second current I2. The value of the first and the second current I1, I2 may be equal to the value of the reference current IREF. The four field-effect transistors 93, 94, 95, 96 of the current source 66 act as current steering circuits. Thus, the first and the second inverter 90, 91 may act as current steering circuits. They deviate the first and the second current I1, I2 through the first or the second terminal 67, 68 or vice versa, depending on the modulator clock signal SM at the control input 71.

If the modulator clock signal SM has a logical value 1 and thus a high voltage value, for example the value of the supply voltage VDD, the N-FET 96 of the second inverter 91 is in a conducting state and the P-FET 94 of the second inverter 91 is set in a non-conducting state. Thus, the second terminal 68 of the current source 66 is conductively connected to the second node 98 and thus to the second current source 102. Therefore, the second current I2 flows from the second terminal 68 of the current source 66 to the reference potential terminal 103. Thus, the second electrode 61 of the sensor 12 is discharged by the second current I2.

The inverter 92 generates an inverted modulator clock signal SMI that is inverted with respect to the modulator clock signal SM. The inverted modulator clock signal SMI is provided to the control terminal of the first inverter 90. If the modulator clock signal SM has a logical value 1, the inverted modulator clock signal SMI has a logical value 0 and thus a low voltage value, for example a ground potential GND. The ground potential GND can be tapped at the reference potential terminal 102. Thus, the P-FET 93 of the first inverter 90 is set in a conducting state and the N-FET 95 of the first inverter 90 is set in a non-conducting state. Therefore, the first current I1 flows from the supply voltage terminal 100 to the first terminal 67 of the current source 66. Thus, the first current I1 flows from the supply voltage terminal 100 through the first mirror transistor 106, the first node 97 and the P-FET 93 of the first inverter 90 to the first terminal 67 of the current source 66. Thus, the first electrode 60 of the sensor 12 is charged by the first current I1.

If the modulator clock signal SM has a logical value 0, the first current I1 flows from the supply voltage terminal 100 to the second terminal 68 of the current source 66 and thus to the second electrode 61 of the sensor 12. Thus, the second electrode 61 of the sensor 12 is charged by the first current I1.

If the modulator clock signal SM has a logical value 0, the inverted modulator clock signal SMI has a logical value 1 and thus a high voltage value, the second current I2 flows from the first terminal 67 of the current source 66 to the reference potential terminal 103. Thus, the first electrode 60 of the sensor 12 is discharged by the second current I2.

Therefore, the current source 66 provides a current for charging and discharging the first electrode 60. Additionally, the current source 66 provides a current for charging and discharging the second electrode 61.

Figure 3C:
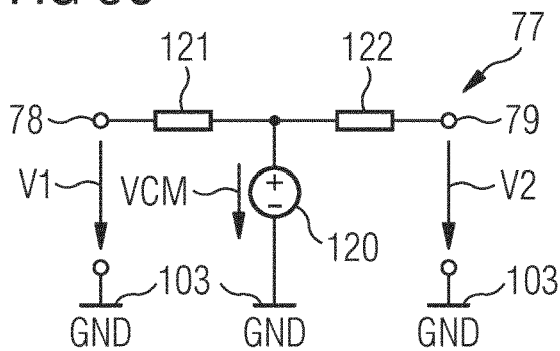

FIG. 3C shows an example of an embodiment of the bias circuit 77 that is a further development of the embodiment shown in FIG. 3A. The bias circuit 77 is realized as a bias network. The bias circuit 77 comprises a voltage source 120. The first terminal 78 of the bias circuit 77 is coupled via the voltage source 120 to the reference potential terminal 103. The bias circuit 77 comprises a first resistor 121. The first resistor 121 couples the first terminal 78 of the bias circuit 77 to the voltage source 120. Additionally, the second terminal 79 of the bias circuit 77 is coupled via the voltage source 120 to the reference potential terminal 103. The bias circuit 77 comprises a second resistor 122. The second resistor 122 couples the second terminal 79 of the bias circuit 77 to the voltage source 120.

The voltage source 120 generates a source voltage VCM. The source voltage VCM is provided to the first terminal 78 via the first resistor 121 and to the second terminal 79 via the second resistor 122. The first and the second resistor 121, 122 may have a high resistance value. A resistance value of the first and the second resistor 121, 122 may be equal. The resistance value of the first and the second resistor 121, 122 may be higher than 1 k, optionally higher than 1 Mn. Since the current source 66 alternatively provides a positive current and a negative current at the first terminal 64 of the test circuit 14 to the first electrode 60, the first voltage V1 is a variable voltage. The first voltage V1 is not constant. Similarly, the second voltage V2 is a variable voltage. The second voltage V2 is not constant. Thus, the bias circuit 77 is configured to set an average voltage of the first voltage V1. The first voltage V1 is not symmetrical in relation to the ground potential GND. The average of the first voltage V1 has an offset in relation to the ground potential GND. The average voltage of the first voltage V1 is equal to the source voltage VCM. Correspondingly, the bias circuit 77 is configured to set an average voltage of the second voltage V2. The average voltage of the second voltage V2 is equal to the source voltage VCM.

Figure 3D:
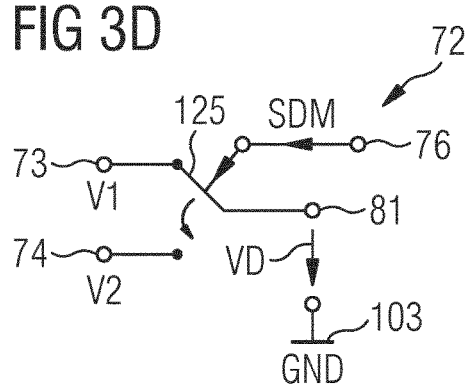

FIG. 3D shows an example of an embodiment of the demodulator circuit 72 that is a further development of the embodiment shown in FIG. 3A. The demodulator circuit 72 comprises a changeover switch 125. A first input of the changeover switch 125 is connected to the first input 73 of the demodulator circuit 72 and a second input of the changeover switch 125 is connected to the second input 74 of the demodulator circuit 72. An output of the changeover switch 125 is connected to the output 81 of the demodulator circuit 72. The changeover switch 125 comprises a control terminal connected to the control input 76 of the demodulator circuit 72.

The demodulator clock signal SDM is provided to the control terminal of the changeover switch 125. Thus, the demodulator circuit 72 either conductively connects the first terminal 64 of the test circuit 14 to the output 81 of the demodulator circuit 72 or conductively connects the second terminal 65 of the test circuit 14 to the output 81 of the demodulator circuit 72.

Figure 3E:
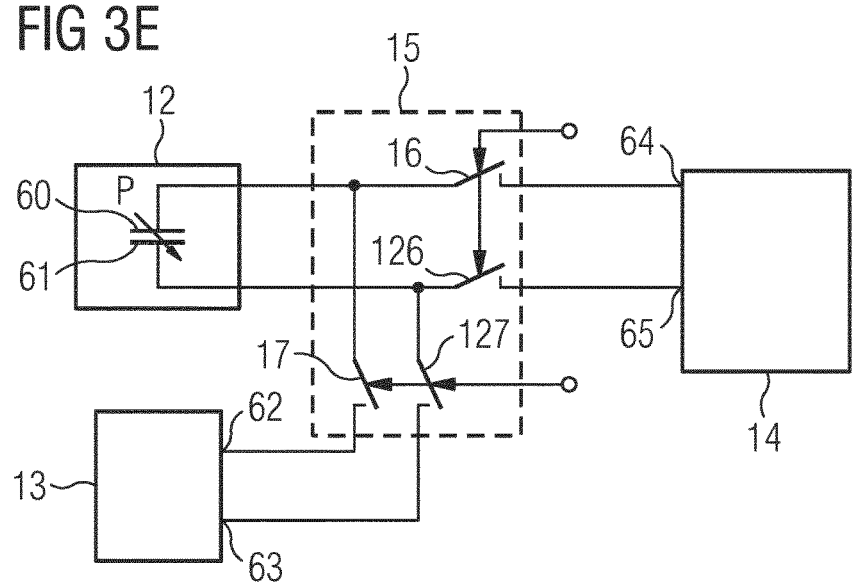

FIG. 3E shows an example of an embodiment of details of the arrangement 10 that is a further development of the embodiments shown above. The first switch 16 couples the first electrode 60 to the first terminal 64 of the test circuit 14. A further first switch 126 of the switching circuit 15 couples the second electrode 61 to the second terminal 65 of the test circuit 14. The second switch 17 couples the first electrode 60 to the first input 62 of the converter 13. A further second switch 127 of the switching circuit 15 couples the second electrode 61 to the second input 63 of the converter 13. The first and the further first switch 16, 126 are controlled by a first signal provided by the digital circuit 14. The second and the further second switch 16, 126 are controlled by a second signal of the digital circuit 14.

In an embodiment, a circuit comprises: A pressure sensor membrane 43; a series of switches 16, 17, 126, 127; a bipolar current source 66; a bias network 77; a demodulator switch 72; a timing generator unit 69; and a low-pass filter 80.

During operation, the membrane 43 is disconnected from the AD converter 13 and connected via switches 16, 126 to the circuit elements described in FIGS. 3A to 3E; connection with the AD converter 13 is restored after all measurements are completed. The bipolar current generator 66 forces a current through the membrane 43 with a sign that depends from a control input 66; in operation it is an AC current. The DC level of the membrane leads is set by the bias network 77 which can be a simple resistor (one per lead) plus the voltage source 120. A demodulator switch 125 connects the membrane leads alternatively to the low-pass filter 8o; the control signal SDM comes from the timing unit 69.

FIG. 4 shows an example of signals of the arrangement 10 shown in FIGS. 1A to 1C and 3A to 3E. FIG. 4 shows signals during the test phase T of operation. In a first phase A of the test phase T, the test circuit 14 operates with zero demodulation clock and in a second phase B of the test phase T, the test circuit 14 operates with 90 demodulation clock. In FIG. 4, the modulator clock signal SM, the first and the second voltage V1, V2, the demodulator clock signal SDM, the demodulated voltage VD and the filtered signal SF are shown as a function of a time t. The modulator clock signal SM is periodically repeated with a period T. The period T of the modulator clock signal SM is equal to a period of the demodulator clock signal SDM. The modulator clock signal SM and the demodulator signal SDM are pulse signals. One period T of the modulator clock signal SM comprises exactly one pulse. A duration of the pulse is equal to the half of the period T. The duty cycle of the modulator clock signal SM is 50%.

In the example shown in FIG. 4, the first voltage V1 has values between a first low value V1L and a first high value V1H. For example, the first voltage V1 rises from the first low value V1L to the first high value V1H during the first half of the period T and falls from the first high value V1H to the first low value V1L in the second half of the period T. This is achieved by charging the first electrode 60 with the first current I1 in the first half of the period T and by discharging the first electrode 60 with the second current I2 in the second half of the period T.

Similarly, the second voltage V2 has values between a second low value V2L and a second high value V2H. For example, the second voltage V2 falls from the second high value V2H to the second low value V2H during the first half of the period T and rises from the second high value V2H to the second high value V2 in the second half of the period T.

In the first phase A, there is no phase difference between the pulses of the modulator clock signal SM and the pulses of the demodulator clock signal SDM. In the first phase A, the demodulator clock signal SDM is equal to the modulator clock signal SM. In the first half of the period T, the changeover switch 125 connects the second input 74 of the demodulator circuit 72 to the output 81 of the demodulator circuit 72. Thus, the second voltage V2 is provided as the demodulated voltage VD at the output 81 of the demodulator circuit 72. In the second half of the period T, the first input 73 of the demodulator circuit 72 is connected to the output 81 of the demodulator circuit 72. Thus, the first voltage V1 is provided as a demodulated voltage VD. The filter 80 generates the filtered signal SF. The source voltage VCM is between the first high value V1H and the first low value V1L of the first voltage V1. The source voltage VCM is also the average of the demodulated voltage VD in the first phase A. Thus, also the filtered voltage SF may have e.g. an average value which is equal to the source voltage VCM. The filtered voltage SF may depend on the shift of voltage versus current that comes from the sensor 12 being a non-ideal capacitance. The shift may be frequency-dependent.

In the second phase B, the modulator clock signal SM and thus also the first and the second voltage V1 and V2 are equal to the voltages in the first phase A. The demodulator clock signal SDM has a phase shift of 90° or T/4 with respect to the modulator clock signal SM. Thus, in the first quarter of a period T and in the last quarter of the period T, the demodulator circuit 72 couples the second input 74 to the output 81. In the second and the third quarter of the period T, the demodulator circuit 72 couples the first input 73 to the output 81. Thus, only the higher values of the first voltage V1 and only the higher values of the second voltage V2 are provided to the output 81. The demodulated voltage VD may be thus above the source voltage VCM. Also the filtered signal SF may be above the source voltage VCM. Real values may be different from the graphical example shown in FIG. 4. The demodulated voltage VD and the filtered signal SF are frequency-dependent.

The timing generator 69 is configured to provide the modulator clock signal SM and the demodulator clock signal SDM with different frequencies, e.g. at least two different frequency values. Thus, the period T is varied by the timing generator 69. The timing generator 69 generates the modulator clock signal SM and the demodulator clock signal SM with a frequency f which is out of a range:

$$f1 \leq f \leq f2.$$

The timing generator 69 forms a sweep through this frequency range between a first frequency f1 and a second frequency f2. Thus, signals out of the frequency range f1 to f2 are provided to the pressure sensor 12. The digital circuit 20 may control the value of the frequency f. For each frequency, the sensor arrangement 10 waits for steady state and acquires the filtered signal SF of the filter 80. This is repeated for the first and the second phase A, B. Thus, the sensor arrangement 10 performs the first and the second phase A, B for each frequency of the frequency range. During each of the several first and second phases A, B, the sensor arrangement 10 waits for steady state before the test result signal SRT is generated.

The arrangement 10 comprises of a circuit that is able to measure the frequency response of the membrane 43, by exciting the membrane 43 with an AC current and using a synchronous demodulator 72 to obtain the in-phase and the quadrature components I, QS of the AC voltage (e.g. 100 mV) across the membrane 43. By analyzing the results over the frequency f, the quality factor Q in addition to the resonance frequency fres may be obtained.

A frequency sweep produces the complete AC response. The resonance frequency fres and quality factor Q (i.e. the full width at half maximum, shorted FWHM, of the resonance peak) is logged as function of pressure P during the calibration run and stored on-chip in the memory 21 as extra calibration parameters.

The arrangement 10 allows to correct for stress changes in the membrane 43 with the on-chip resonance frequency circuit. Shifts in membrane stress induced by e.g. soldering, mechanical clamping, wafer bow change, outgassing can be corrected for by monitoring the resonance frequency fres over time. Depending on the change in the resonance frequency fres the calibrated output SP can be corrected for. In order to detect if the membrane compliance has changed (e.g. the delta between package level calibration results and soldering the device on the customer printed-circuit board, shorted PCB) the pressure output readings SD can be corrected using the information about the resonance frequency fres and the inverse or the quality factor 1/Q that is stored on chip. Advantageously, the information of the resonance frequency fres and the inverse of the quality factor 1/Q are stored as function of pressure P to be able to correct for the stress change.

Compared to a capacitance measurement device, the arrangement 10 works with a frequency range that overlaps the resonance frequency fres of the membrane 43. The first and the second frequency f1, f2 are selected such that: f1 fres s f2.

The excitation signal is square instead of sinusoidal; the purpose is different compared to those devices, as the method is interested in the non-ideal AC response due to parasitic effects.

The timing generator 69 provides a modulator clock signal SM to the current source 66 and a demodulator clock signal SDM to the demodulator switches 72; the phase relation between these two clocks signals SM, SDM can be either 0° or 90°, according to a control signal (provided by the digital circuit 20). A measurement consists in a frequency sweep of the clock signals SM, SDM in both the 0° and 90° mode of operation (called in-phase and quadrature channels); for every frequency point the low pass filter output SF settles to a value that is recorded.

Figure 5A:
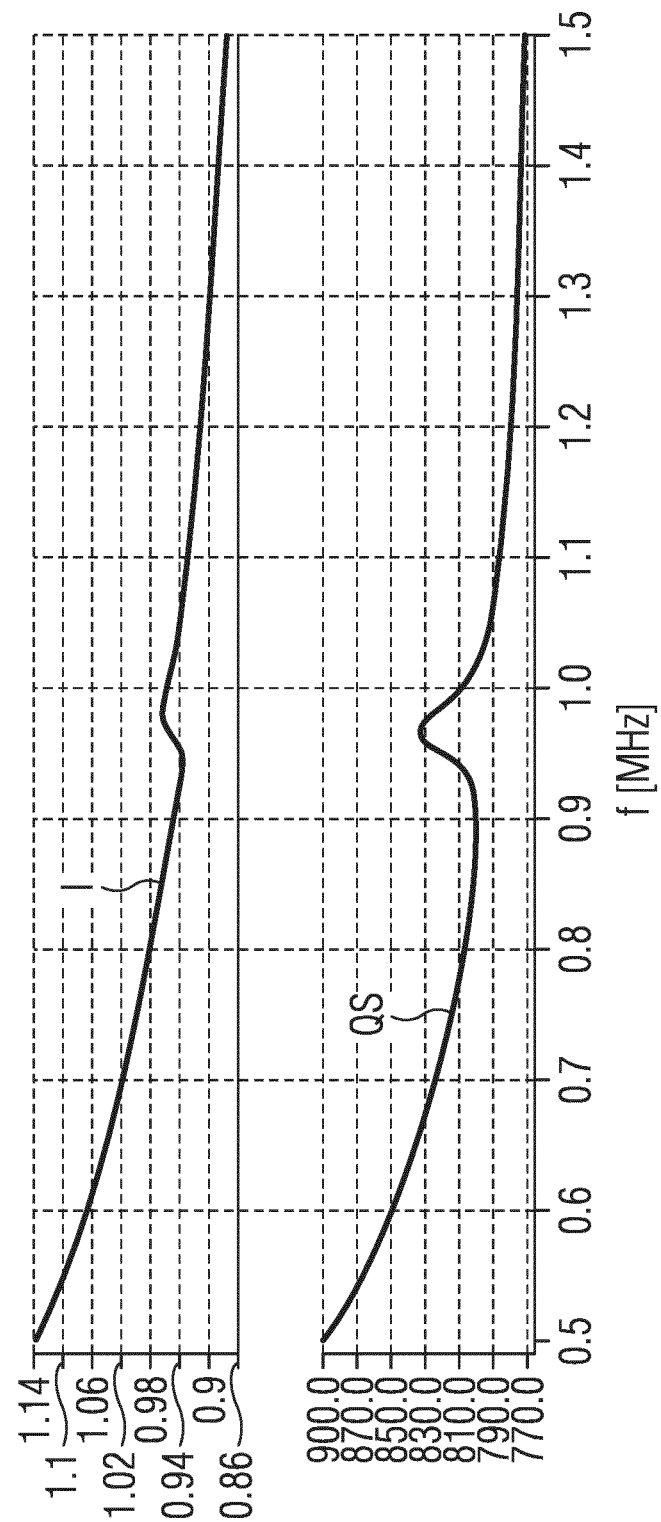

The resonance frequency fres is obtained by analyzing the plots of the in-phase component I versus frequency f and of the quadrature component QS versus frequency f (as shown e.g. in FIG. 5A). A timing diagram detailing typical waveforms is shown in FIG. 4.

The resonance frequency method comprises the following steps: The membrane resonance fres depends on the effective membrane stiffness Deff and the effective mass of the membrane meff,o. The resonance frequency fres is determined by:

$$fres = sqrt(Deff/meff,o).$$

It is reasonable to assume that the effective mass of the membrane 43 is not changing over lifetime and it is known from measurements or models. During final test and/or a production test, the initial resonance frequency fres,o and the initial effective membrane stiffness is determined, e.g. using the equation:

$$Deff,o = meff,o \cdot fres,o2.$$

A drift in the membrane resonance ($\Delta fres = fres - fres,o$) is a direct indication for a change of the effective membrane stiffness:

$$\Delta Deff/Deff,o = 2 \cdot \Delta fres/fres,o \text{ (up to first order)}.$$

Furthermore, the dependency of the sensor output shift from the effective membrane stress change is desired for this compensation method: $\Delta psensor$ ($\Delta Deff$). As pointed out before, it is sufficient to consider only dependencies up to the first order: $\Delta psensor = c \cdot \Delta Deff$, with c being the compensation parameter. This results in:

$$\Delta psensor = 2 \cdot c \cdot meff,o \cdot fres,o \cdot (fres - fres,o).$$

Note that the resonance frequency fres also slightly depends on the atmospheric pressure (patm). This dependency is determined by measurements. Hence the compensation parameter should be stored in the arrangement 10 as a look-up table (e.g. in the memory 21): c(patm). The correction data may be stored e.g. in the look-up table of the memory 21.

To measure the resonance frequency fres, a smaller AC voltage is applied between the bottom and the top electrode 41, 42. The electrostatic force on the membrane 43 will cause the membrane 43 to oscillate with the AC frequency. If the AC frequency is near the resonance frequency fres of the membrane 43, the amplitude of the membrane deflection strongly increases. This means that more energy is dissipated in the membrane 43. The resonance frequency fres is measured as a peak in the real part RE of the electrical impedance spectrum (as e.g. shown in FIG. 5B). The width of the resonance curve is a measure of how small resonance frequency shifts can be detected. Frequency shifts of around $1/10$th of the peak width can be detected. The peak width (or full-width-at-half-maximum, shorted FWHM) fFWHM is given by the quality factor Q of the membrane resonance: fFWHM=fres/Q. Typical values for the pressure sensor 12 are fres=700 kHz and Q=200. For these values, relative resonance frequency shifts of 0.05% can be detected. The relative change of the resonance frequency fres is half of the relative change of the effective membrane stiffness. If a relative sensor output of 0.1% is to be detected, the resolution of the relative resonance frequency shift should be 0.05%. This means that these sensor output shifts are detectable by a shift in the resonance frequency fres.

FIG. 5A shows an example of signals gained by the test circuit 14 as shown in FIGS. 3A to 3E and 4. In FIG. 5A, results of a frequency sweep on a model of a membrane 43 of a pressure sensor 12 are shown. The upper curve shows an I-channel (in-phase signal I of the phase A) and the lower curve show a Q-channel (quadrature signal QS of the phase B). The frequency sweep is performed between the first frequency f1 equal to 0.5 MHz and the second frequency f2 equal to 1.5 MHz. The in-phase signal I has a peak at the frequency f3 and the Q-channel QS has a peak at the frequency f4.

FIG. 5B shows an example of signals as a function of the frequency f resulting from an AC response of a sensor 12 having the membrane 43 as shown above. A frequency sweep is performed between a first frequency f1=700 KHz to a second frequency f2=1.3 MHz. The AC response of the same membrane model is shown. In FIG. 5B, a magnitude MA, a phase PH, a real part RE and an imaginary part IM are shown. The phase signal PH and the real part RE have a minimum at the resonance frequency fres of the membrane 43 of the pressure sensor 12. The magnitude signal MA and the imaginary part IM have an inflection point at the resonance frequency fres.

Figure 6A:
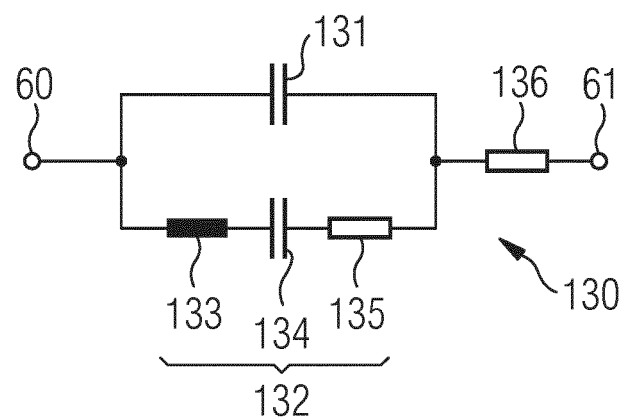
FIGS. 6A and 6B show an example of a model and of measured values of a pressure sensor.

FIG. 6A shows an example of an embodiment of a model of the pressure sensor 12. In FIG. 6A, an electrical model of the pressure sensor 12 is shown in the form of an equivalent circuit 130. The equivalent circuit 130 of the sensor 12 comprises two terminals which correspond to the first and the second electrode 60, 61. The equivalent circuit 130 comprises a capacitor 131. A first terminal of the capacitor 131 is directly connected to the first electrode 60 and a second terminal of the capacitor 131 is connected to the second electrode 61 e.g. via a series resistor 136. Moreover, the circuit 130 comprises a series circuit 132. The series circuit 132 is connected in parallel to the capacitor 131. The series circuit 132 couples the first electrode 60 to a node between the capacitor 131 and the series resistor 136. The series circuit 132 comprises an inductor 133, a further capacitor 134 and a resistor 135. The main contribution to the electrical behavior of the pressure sensor 12 results from the capacitor 131. The series resistor 136 may be omitted and may be replaced by a connection line.

Figure 6B:
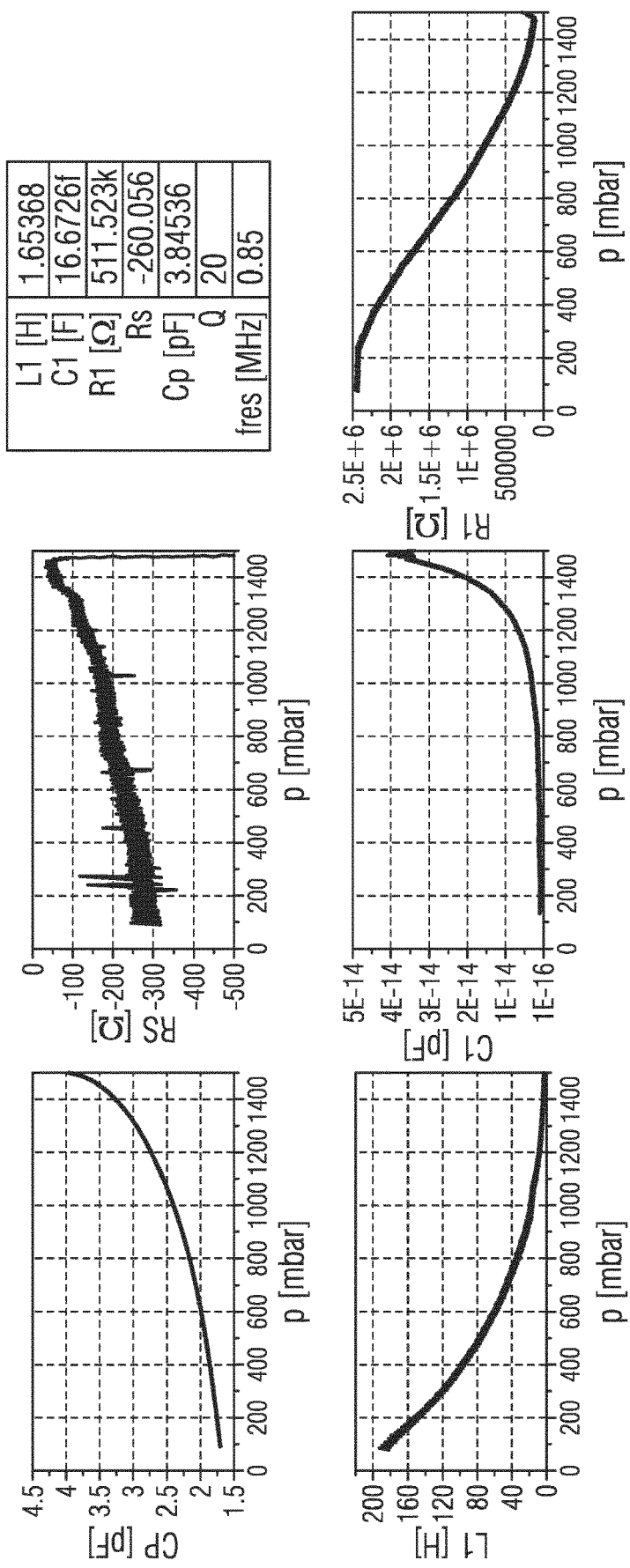

FIG. 6B shows an example of values of the parts of the equivalent circuit 130 shown in FIG. 6A. A capacitance value CP of the capacitor 131, a resistance value RS of a series resistor 136, an inductance value Li of the inductor 133, a further capacitance value C1 of the further capacitor 134 and a resistance value R1 of the resistor 135 are shown as a function of the pressure P applied to the sensor 12. An increasing value of the pressure P results in a reduction of the distance of the first electrode 60 to the second electrode 61. Thus, as shown in FIG. 6B, an increasing value of the pressure P results in an increasing value of the capacitance CP.

Figure 7A:
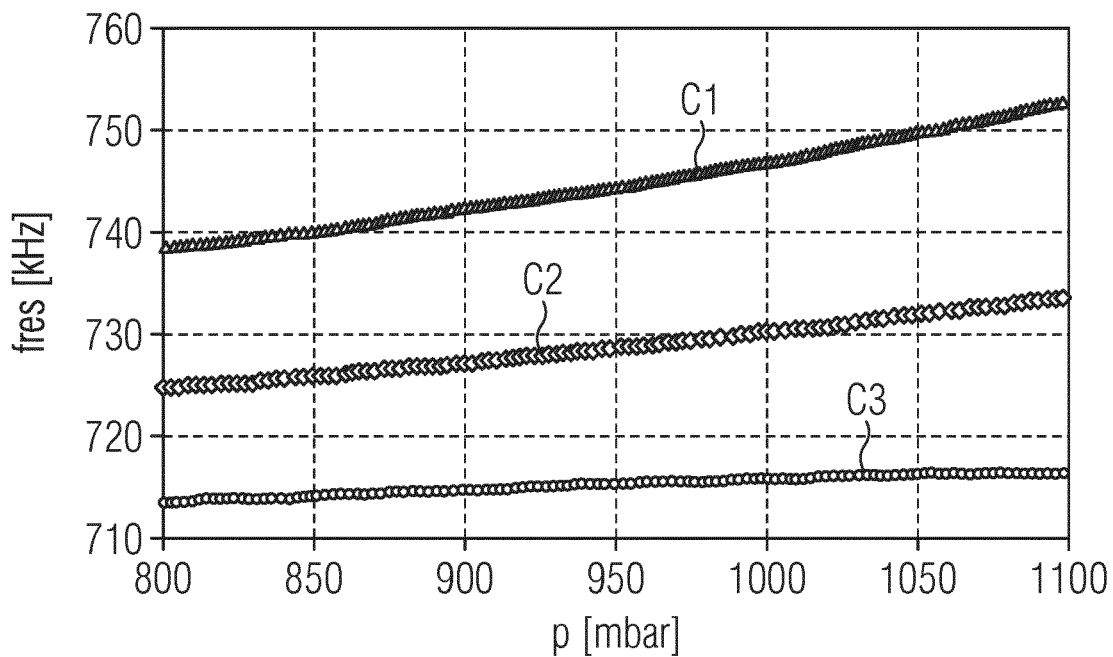
FIGS. 7A and 7B show an example of measurements of a pressure sensor.
Figure 7B:
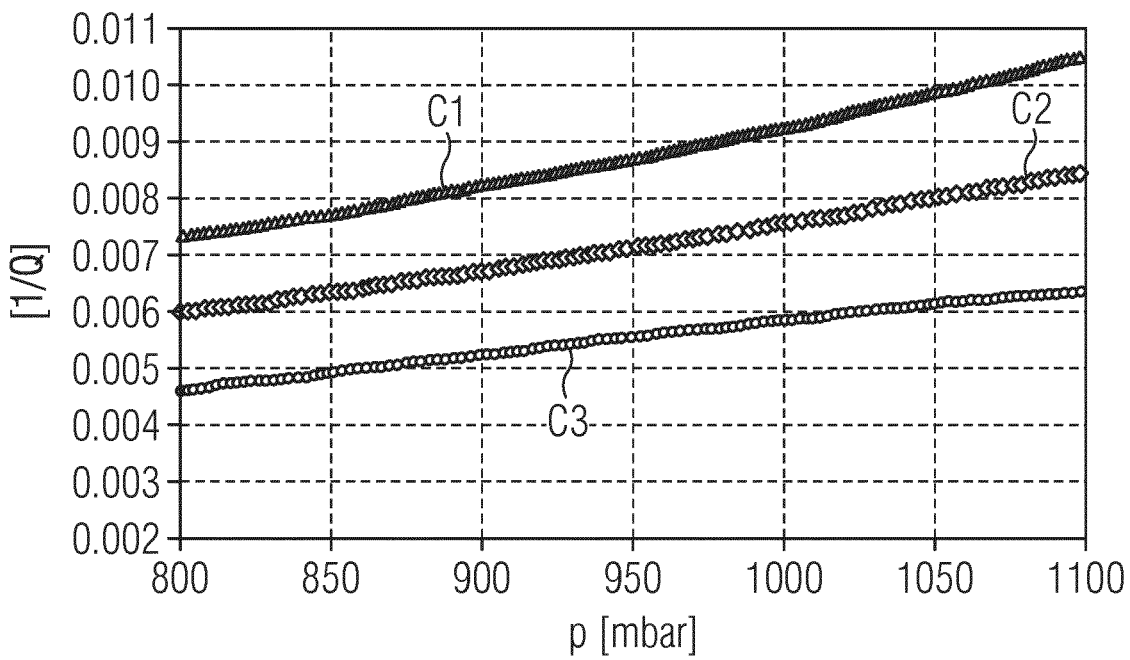

FIGS. 7A and 7B show an example of signals of the pressure sensor. In FIG. 7A, the resonance frequency fres is shown as a function of the pressure P, whereas in FIG. 7B the inverse value of the quality factor 1/Q is shown as a function of the pressure P. The reference frequency fres and the inverse of the quality factor 1/Q are shown for three different conditions. At a first condition C1, the cavity pressure is equal to 18 hPa (hPa=hectopascal). A second condition C2 is a cavity pressure of 90 hPa after outgassing for 48 hours at 200° C. A third condition C3 is achieved at a cavity pressure of 20 hPa after outgassing for 184 hours at 200° C. The dependency of the resonance frequency fres on membrane stress has been proven by changing the wafer bow. Also the dependence of the resonance frequency fres on the atmospheric pressure is tested, as shown in FIG. 7A.

Figure 8:
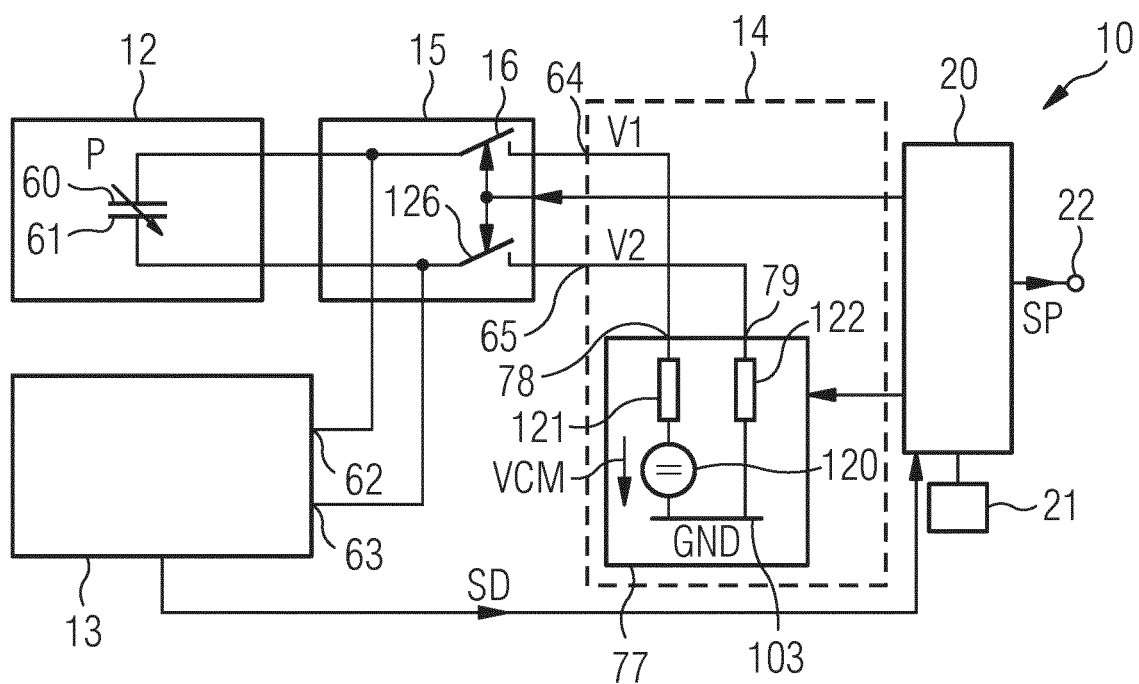
FIG. 8 shows a further example of an embodiment of a sensor arrangement.

FIG. 8 shows a further example of an embodiment of the arrangement 10 that is a further development of the above shown embodiments. The first and the second input 62, 63 of the converter 13 are permanently connected to the first and the second electrode 60, 61 by the switching circuit 15. The first and the second terminal 64, 65 of the test circuit 14 are coupled to the first and the second electrode 60, 61 by the switching circuit 15, namely by the first and the further first switch 16, 126. The second terminal 79 of the bias circuit 77 is coupled via the second resistor 122 to the reference potential terminal 103. Thus, the first electrode 60 is biased by the source voltage VCM with respect to the second electrode 61. The converter 13 is configured to measure the capacitance value of the sensor 12 even in case of a bias between the first and the second electrode 60, 61.

The digital circuit 20 is connected to a control terminal of the voltage source 120 and controls the value of the source voltage VCM. Thus, the converter 13 provides the digital signal SD in the test phase T and the measurement phase M of operation to the digital circuit 20. In the test phase T of operation, the digital signal SD is measured at different values of the source voltage VCM (e.g. at at least two different values of the source voltage VCM).

The capacitance versus voltage method comprises the steps: If a DC bias VDC is applied between the bottom and the top electrode 41, 42, the electrostatic force causes the membrane 43 to deflect downwards. The capacitance C between the bottom and the top electrode 41, 42 increases with the DC bias (VDC) as C=Co+α VDC or C=Co+α VDC2. The DC bias VDC is equal to the source voltage VCM. The parameter α depends on the membrane stiffness. The parameter α may be also called Ao parameter. A relative change of the membrane stiffness equals the relative change of the parameter α. The parameter α also depends on the atmospheric pressure P. A sensor output shift during life time causes an additional error in the dependency of a on the atmospheric pressure P.

Comparably as in the resonance frequency method a correlation between a change of the parameter a and the sensor output is found by either a physical model or by accelerated lifetime testing. By knowing this correlation, the arrangement 10 can compensate the sensor output shifts by measuring changes of the parameter α. This parameter α is constant over the lifetime. It is expected that it is the same for different devices. The CV method may have a lower accuracy than the resonance frequency method.

In long term markets like Home and Building Automation (abbreviated HABA) high accuracy over a long lifetime of 20 years is advantageous. Additionally, in the mobile devices market with shorter lifetimes the arrangement 10 will give an advantage because of the larger sensor drifts due to the more extreme mission profile (higher temperatures, larger temperature cycles).

The proposed disclosure can be used in pressure sensors. However, the same method can be applied to many other MEMS sensors like accelerometers, gyroscopes and so on in the same or a slightly adapted fashion.

In general, the term "coupled" may be replaced by "connected" or "directly and permanently connected". The term "connected" may be replaced by "coupled" or "directly and permanently connected.

Although the invention has been illustrated and described in detail by means of the preferred embodiment examples, the present invention is not restricted by the disclosed examples and other variations may be derived by the skilled person without exceeding the scope of protection of the invention.

The invention claimed is:

1. A sensor arrangement comprising:
   a pressure sensor realized as a capacitive pressure sensor and comprising a first electrode and a second electrode;
   a capacitance-to-digital converter with a first input and a second input;
   a test circuit with a first terminal and a second terminal; and
   a switching circuit coupling the first and second terminals of the test circuit to the first and second electrodes and coupling the first and second inputs of the capacitance-to-digital converter to the first and second electrodes,
   wherein the test circuit comprises:
      a current source with a first terminal and a second terminal coupled to the first and second terminals of the test circuit,
      a timing generator coupled to the current source and being configured to provide a modulator clock signal to the current source, and
      a demodulator circuit with a first input and a second input coupled to the first and second terminals of the test circuit, and
      wherein the timing generator is coupled to the demodulator circuit and is configured to provide a demodulator clock signal to the demodulator circuit.

2. The sensor arrangement according to claim 1, further comprising a semiconductor body, wherein the semiconductor body comprises the pressure sensor, the capacitance-to-digital converter, the test circuit and the switching circuit.

3. The sensor arrangement according to claim 1, further comprising:
   a digital circuit coupled to the capacitance-to-digital converter, the test circuit and the switching circuit; and
   a memory connected to the digital circuit.

4. The sensor arrangement according to claim 3, wherein, in a test phase operation, the digital circuit is configured to:
   control the switching circuit such that the test circuit is coupled to the pressure sensor or that the test circuit and the capacitance-to-digital converter are coupled to the pressure sensor, and
   store correction data in the memory.

5. The sensor arrangement according to claim 3, wherein, in a measurement phase operation, the digital circuit is configured to:
   control the switching circuit such that the capacitance-to-digital converter is coupled to the pressure sensor, and
   provide a digitized pressure signal depending on a digital signal provided by the capacitance-to-digital converter and correction data stored in the memory.

6. The sensor arrangement according to claim 1, wherein, in a test phase operation, the sensor arrangement is configured to perform a frequency sweep and to determine a resonance frequency of a membrane of the pressure sensor.

7. The sensor arrangement according to claim 1, wherein the test circuit comprises:
   a filter coupled to an output side of the demodulator circuit; and
   an analog-to-digital converter coupled to an output side of the filter and to an input of a digital circuit.

8. The sensor arrangement according to claim 1, wherein the test circuit comprises a bias circuit with a first terminal and a second terminal coupled to the first and second terminals of the test circuit.

9. A method for operating a sensor arrangement, the method comprising
   coupling, in a measurement phase, a capacitance-to-digital converter to a pressure sensor via a second switch of a switching circuit; and
   coupling, in a test phase, a test circuit to the pressure sensor via a first switch of the switching circuit;
   controlling, by a digital circuit in the test phase, the switching circuit such that the test circuit is coupled to the pressure sensor and the capacitance-to-digital converter is disconnected from the pressure sensor;
   storing, by the digital circuit in the test phase, correction data in a memory;
   controlling, by the digital circuit in the measurement phase, the switching circuit such that the capacitance-to-digital converter is coupled to the pressure sensor and the test circuit is not connected to the pressure sensor; and
   providing, by the digital circuit in the measurement phase, a digitized pressure signal depending on a digital signal provided by the capacitance-to-digital converter and the correction data stored in the memory,
   wherein the pressure sensor is realized as a capacitive pressure sensor,
   wherein the digital circuit is coupled to the capacitance-to-digital converter, the test circuit and the switching circuit, and
   wherein the memory is connected to the digital circuit.

10. The method according to claim 9, further comprising:
    coupling, in a further measurement phase, the capacitance-to-digital converter to a further pressure sensor via the switching circuit; and
    coupling, in a further test phase, the test circuit to the further pressure sensor or coupling the test circuit and the capacitance-to-digital converter to the further pressure sensor via the switching circuit.

11. The method according to claim 9, wherein storing the correction data in the memory comprises storing, by the digital circuit in the test phase, the correction data in the memory depending on at least one of a test result signal provided by the test circuit and the digital signal provided by the capacitance-to-digital converter.

12. A sensor arrangement comprising:
    a pressure sensor that is realized as a capacitive pressure sensor;
    a capacitance-to-digital converter;
    a test circuit;
    a switching circuit comprising a first switch coupling the test circuit to the pressure sensor and a second switch coupling the capacitance-to-digital converter to the pressure sensor;
    a digital circuit coupled to the capacitance-to-digital converter, the test circuit and the switching circuit; and a memory connected to the digital circuit, wherein, in a test phase, the digital circuit is configured to:

control the switching circuit such that the test circuit is coupled to the pressure sensor and the capacitance-to-digital converter is disconnected from the pressure sensor, and store correction data in the memory, and wherein, in a measurement phase, the digital circuit is configured to:

control the switching circuit such that the capacitance-to-digital converter is coupled to the pressure sensor and the test circuit is not connected to the pressure sensor, and provide a digitized pressure signal depending on a digital signal provided by the capacitance-to-digital converter and the correction data stored in the memory.

* * * * *